United States Patent [19]

Timmons

[11] 4,327,412
[45] Apr. 27, 1982

[54] WELL LOGGING DATA PROCESSING TECHNIQUE

[75] Inventor: John P. Timmons, White Plains, N.Y.

[73] Assignee: Schlumberger Limited, New York, N.Y.

[21] Appl. No.: 84,125

[22] Filed: Oct. 12, 1979

Related U.S. Application Data

[63] Continuation of Ser. No. 276,347, Jul. 31, 1972, abandoned.

[51] Int. Cl.³ .................... G06F 15/20; G06F 15/31
[52] U.S. Cl. ................................. 364/422; 324/323; 324/339; 340/860
[58] Field of Search ............... 364/300, 421, 422, 728; 340/853, 860; 324/323, 339; 33/133, 142

[56] References Cited

U.S. PATENT DOCUMENTS

| | | | |
|---|---|---|---|
| 3,396,787 | 8/1968 | Vann | 166/4 |
| 3,497,958 | 3/1970 | Gollwitzer | 33/133 |
| 3,552,025 | 1/1971 | Whitfill | 33/133 |
| 3,566,478 | 3/1971 | Hurlston | 33/142 |
| 3,568,143 | 3/1971 | Naquin, Jr. | 364/421 X |

Primary Examiner—Jerry Smith
Attorney, Agent, or Firm—Cooper, Dunham, Clark, Griffin & Moran

[57] ABSTRACT

In accordance with an illustrative embodiment of the invention, a technique is set forth for determining a displacement between two or more well logs separately derived from investigating devices passed through a borehole. More particularly, displacements are determined for a number of levels through use of a suitable correlation function compensated for various adverse effects. The displacements for a selected number of levels are analyzed to determine average displacements at representative levels. The average displacements and representative levels are analyzed to determine intermediate levels and corresponding distributed displacements for distributing large changes in displacements. Application of these distributed displacements at the intermediate levels minimizes changes in the nature of the logs that would be caused by abrupt application of large changes in displacements to the logs at one depth level to align the logs. The correlation function is selectively scaled and displayed as a function of successive levels for use in subsequent analysis.

37 Claims, 12 Drawing Figures

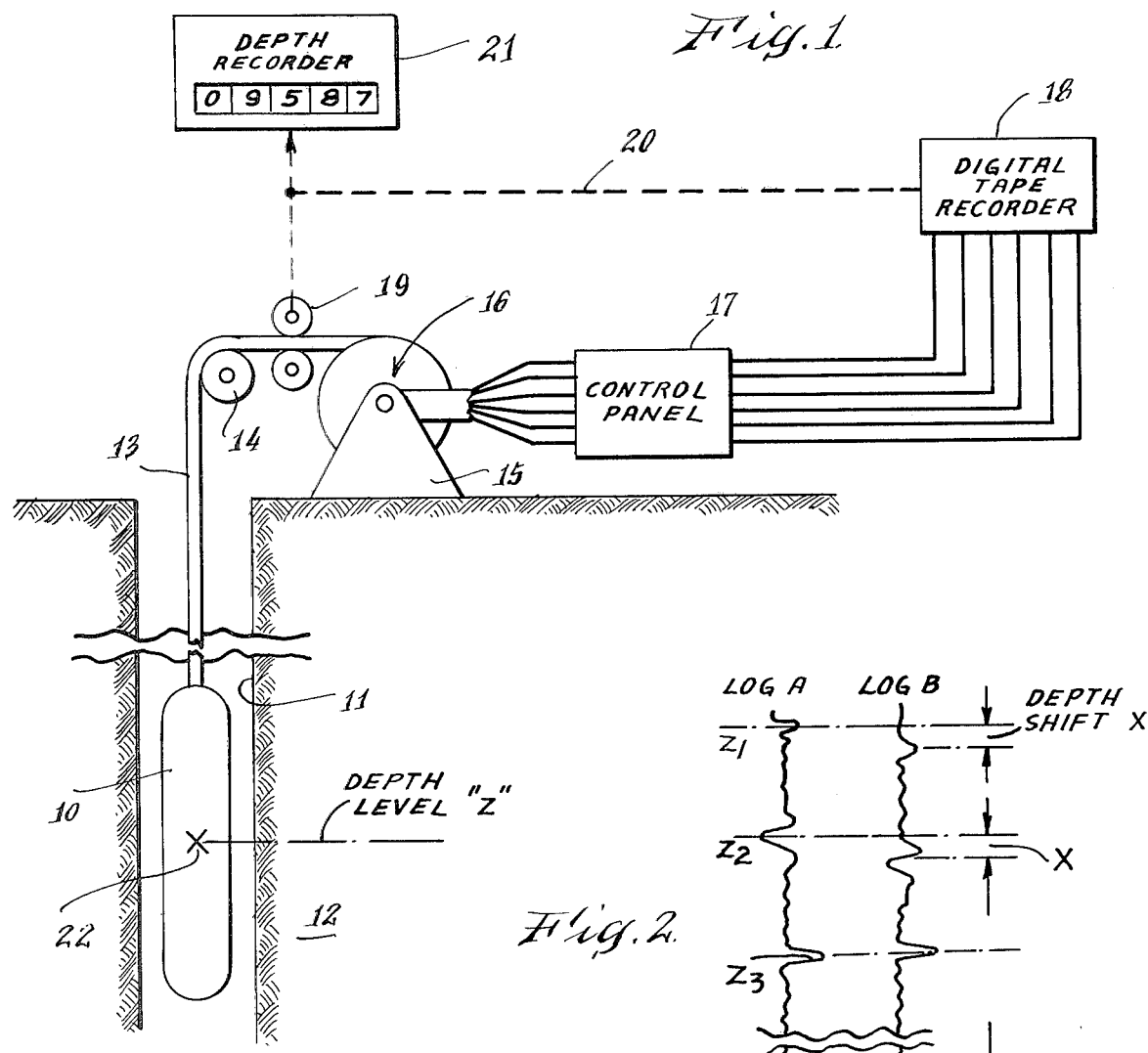

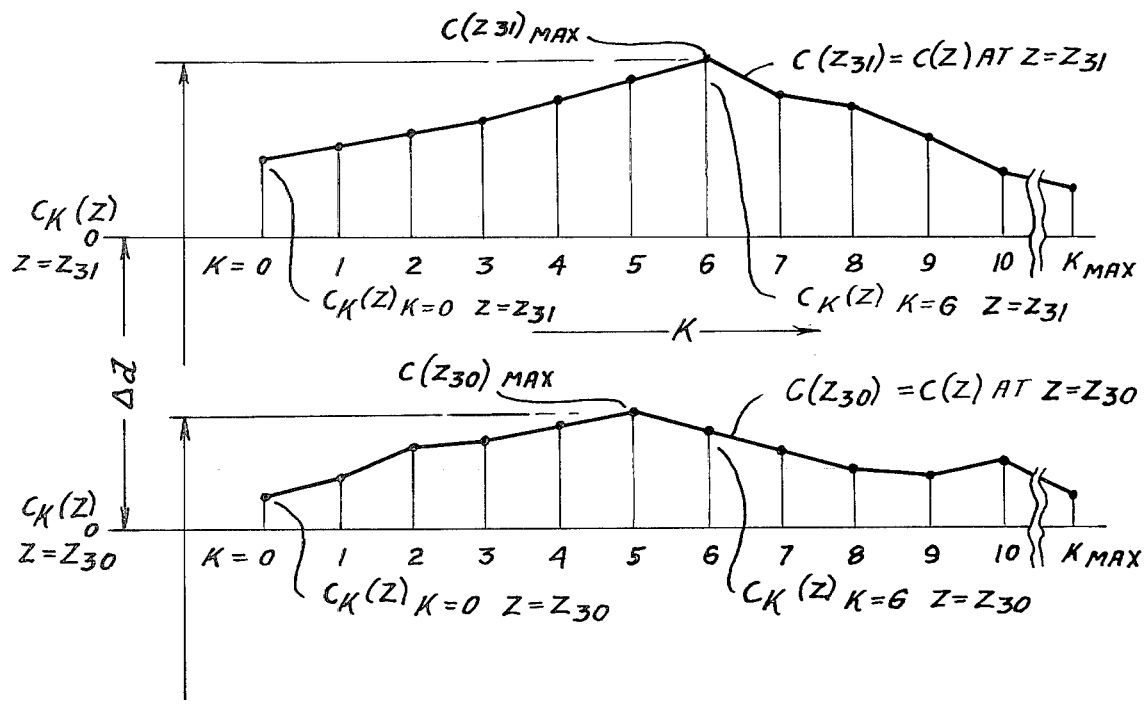

*Fig. 5.*

$TOL = 6''$  $UDC_{MIN} = 3$  $\Delta ZS = 12''$ (2 SAMPLES)
$\Delta Z_0 = 6''$  $UDC = 0$ AND $DPS = $ START DEPTH

| D | SH(Z) | UDC | DCS | SHS(1) | SHS(2) | ----- | SHS(UDC) | $SH_D$ | SHA | DPS | SHF |
|---|---|---|---|---|---|---|---|---|---|---|---|
| 51 | −12 | 1 | 51 | −12 | — | | — | −12 | — | 51 | — |
| 53 | −6 | 2 | | | −6 | | — | −6 | — | — | — |
| 63* | +12 | 1 | 63 | +12 | | | — | +12 | — | — | — |
| 65 | +6 | 2 | | | +6 | | — | +6 | — | — | — |
| 67 | 0 | 3 | 67 | | | | 0 | 0 | +6 | <u>61</u> | <u>+6</u> |
| 69 | +6 | 4 | | | | | | +6 | | 69 | |
| 73* | +12 | 5 | | | | | | +12 | | 73 | |
| 81* | 0 | 1 | 81 | 0 | | | | 0 | | | |
| 83 | −12 | 1 | 83 | −12 | | | | −12 | | | |
| 89 | −12 | 2 | | | −12 | | | −12 | | | |
| 91 | −12 | 3 | | | | | | | −12 | <u>75</u> | <u>0</u> |
| | | | | | | | | | | <u>77</u> | <u>−6</u> |
| | | | 91 | | | | −12 | −12 | | <u>81</u> | <u>−12</u> |
| 93 | −18 | 4 | | | | | | −18 | | 93 | |
| 95 | −6 | 1 | 95 | −6 | | | | −6 | | | |
| 99* | −6 | 2 | | | −6 | | | −6 | | | |
| 101 | −6 | 3 | 101 | | | | −6 | −6 | −6 | <u>93</u> | <u>−6</u> |

\* DENOTES ADDITIONAL DEPTHS NOT CONSIDERED
   BECAUSE $C(Z)_{MAX} \lessgtr C_K(lim)$
— DENOTES VALUES NOT YET DEFINED
   IN THE HISTORY FILE
   BLANKS INDICATE NO NEW DEFINITION OF
   THE PREVIOUSLY DEFINED VALUE
<u>61 +6</u> UNDERLINED NUMBERS DENOTE
   OUTPUT VALUES

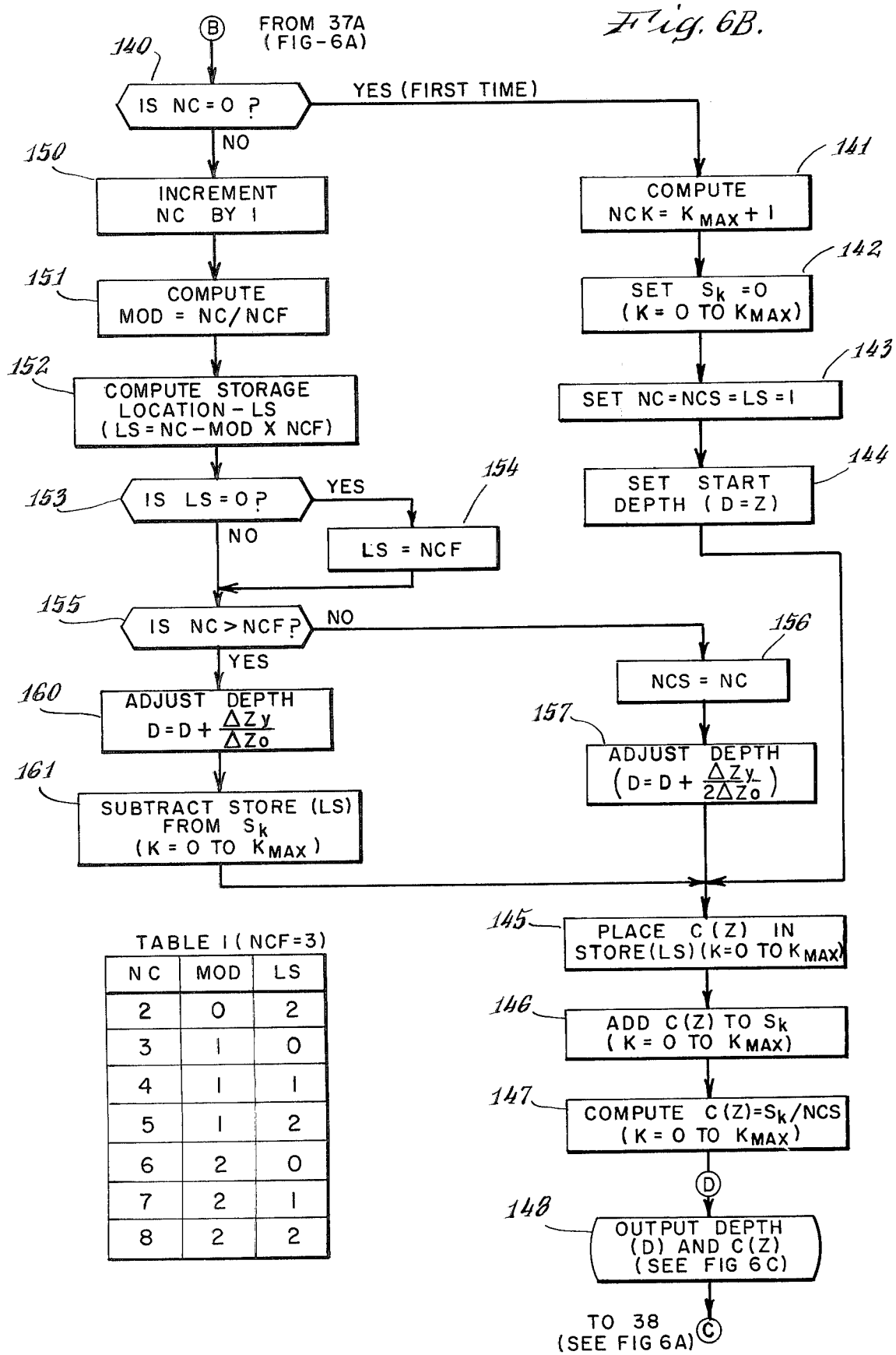

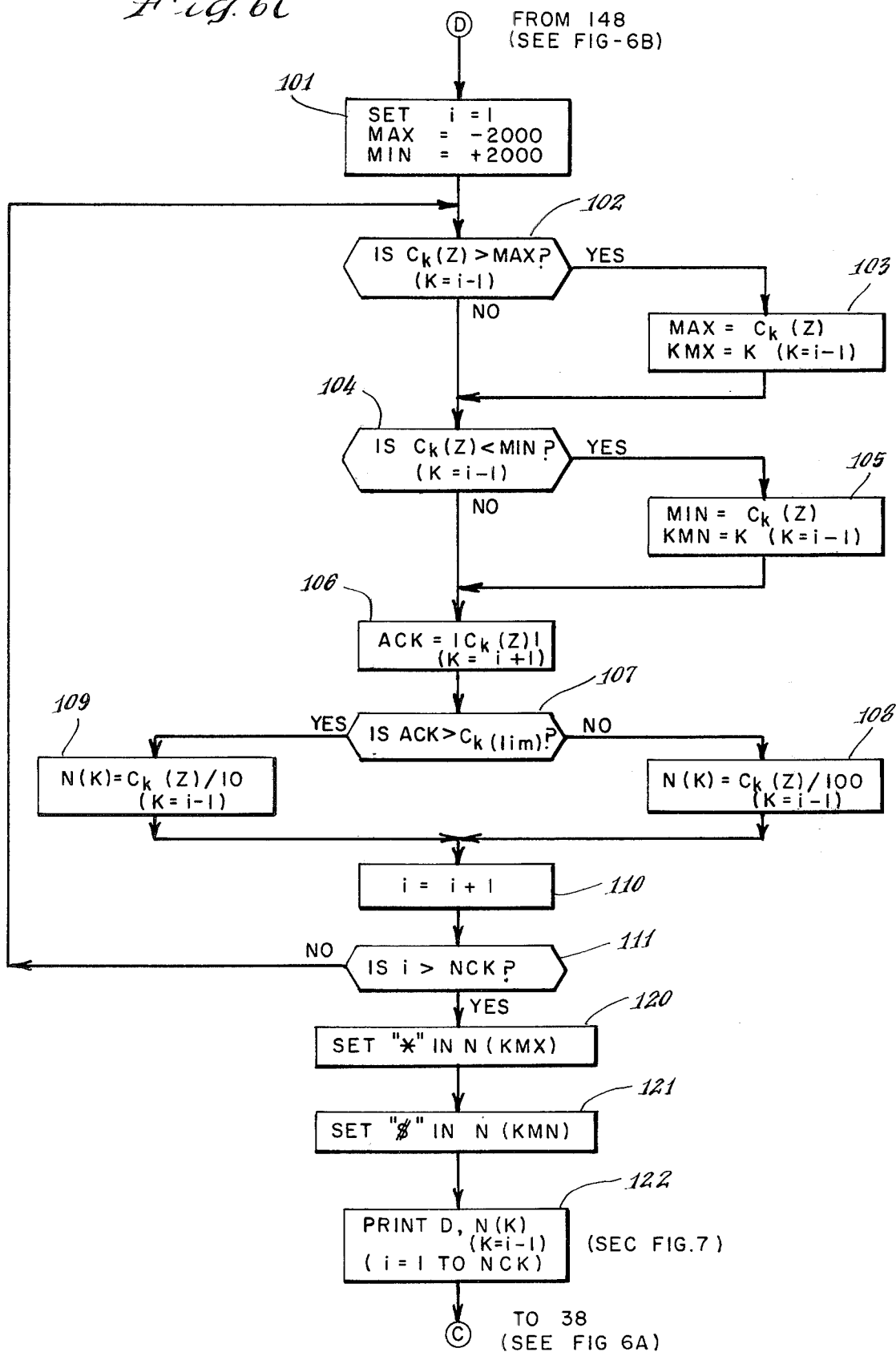

WELL LOGGING DATA PROCESSING TECHNIQUE

This is a continuation of application Ser. No. 276,347, filed July 31, 1972 and now abandoned.

This invention relates to methods for correlating the relative levels of well logging data derived from separate investigating devices or from separate pieces of the same device through a borehole to determine displacements between the data. In particular, the invention relates to data processing techniques for accomplishing such correlation and determination of displacements.

In the logging of an earth borehole, measurements of various formation characteristics are taken at different depth levels throughout the borehole by means of investigating devices lowered into the borehole on the end of a supporting cable extending from the surface of the earth. Typically, the measurements taken along the length of the borehole are intended to provide indications of oil or gas bearing strata. It is more and more the practice to combine measurements taken during separate passes or runs through a borehole with different investigating devices to produce computed measurement of various characteristics or parameters of the earth formations. When combining measurements made from separate devices or from the same device on separate runs through the borehole, it is important that the separately derived measurements be accurately correlated in regard to displacement with one another.

In the past, sheave-wheel devices located at the surface of the earth have provided measurements of the length of cable which passes over the sheave wheel. Unfortunately, such a cable length measuring device does not accurately take errors caused by variation in cable stretch into account.

For the usual situation, these errors are insignificant and can be ignored. However, when considering the more recent sophisticated and high-powered computational techniques, it becomes desirable to obtain highly accurate determinations of displacements between separately derived data before combining such data for computational purposes. One method of determining displacement between data is shown in U.S. Patent Application Ser. No. 070,709 filed Sept. 9, 1970 for D. H. Tinch et al and now abandoned. This D. H. Tinch et al method uses standard correlation methods to determine displacements at various depth levels which are subsequently analyzed in a novel manner to obtain more accurate depth shifts.

Standard correlation methods employ known equations for correlation factors to determine the similarity between two selected groups of samples of data. In well log correlation, a correlation factor value is computed as a measure of similarity between a selected group of samples of data derived from an investigating device on one pass through a borehole and a selected group of samples of data derived from a separate device or the same device on another pass through a borehole. The correlation factor corresponds to one possible depth displacement between the separately derived data. A plurality of correlation factor values comprising a correlation function is computed to measure a plurality of similarities between a selected group of samples of data derived from a device on one pass through a borehole and a plurality of groups of samples of data derived from a separate device or the same device on another pass through a borehole corresponding to a plurality of possible depth displacements between the separately derived data. The plurality of correlation factor values define a correlation function which is a measure of the similarities for various displacements between the two groups of samples of separately derived data at one level. The values of the correlation function are compared to determine a correlation factor representing the maximum similarity. This correlation factor corresponds to the displacement between the selected groups of samples of separately derived data.

It has been observed that incorrect displacements are sometimes determined when a correlation factor value is affected by large differences in mean values and/or in amplitude scale factors between groups of samples of data used in the correlation. Equations for correlation factors employing either mean value normalization or amplitude scale factor normalization or, both normalizations at the same time, may be used to produce normalized correlation factors. Mean value normalization is accomplished by subtracting a mean value for each group of corresponding samples used in the evaluation of the correlation factor from each sample in the group. Amplitude scale factor normalization is accomplished by dividing the sum of the products of the samples in each group by the product of the sums of the differences between values of each sample and the mean value of all samples in each group.

Normalized correlation factors are used to reduce the number of incorrectly determined displacements. However, values for normalized correlation factors similar to the values corresponding to a correct displacement are sometimes present for incorrect displacements. In such cases, it is difficult to determine the correct displacement. If one of these similar values is inadvertently used to select the displacement, an incorrect displacement will result.

Previous attempts to reduce the determination of incorrect displacements have employed large groups of samples of data corresponding to long correlation intervals in hope of minimizing effects on correlation factors produced by adverse factors such as noise and the aforementioned differences in mean values and amplitude scale factors between the groups of samples of data. In another approach, a search of the data is made in an attempt to detect such adverse factors in order to prevent any correlation which would include such factors. These last two mentioned attempts have not produced satisfactory results.

It would be desirable to produce an improved correlation function which would be compensated for various adverse effects and provide a unique indication of displacement which is the correct one.

It therefore is an object of the present invention to provide new and improved methods of determining displacements between well logging data derived from separate investigating devices or from separate passes of the same device through the borehole.

In accordance with the present invention, a method of determining the displacement between a plurality of well logs separately derived from investigating devices passed through a borehole comprises producing first and second data derived from separate investigating devices or from separate passes of the same device through a borehole and determining a normalized correlation function corresponding to a plurality of displacements between a selected group of samples of the first data and corresponding groups of samples of the second data which is assumed, as a first assumption to have a predetermined displacement relationship with the group of samples of the first data. The step of determining the normalized correlation function is repetitively repeated for a number of overlapping successive groups of samples of the first data to produce a number of overlapping correlation functions. At least some of these overlapping correlation functions are combined to produce an improved correlation function.

In order to determine possible displacements from a correlation function, the various changes in values of the function, the position of characteristic features of the function and how these values and features change for various sample levels and groups of samples of well logging data, it is necessary to examine values for various correlation functions for each sample level over the interval of interest. In the past, values of the function for various displacements between two groups of samples have been computed and listed as a table of values. Careful examination of the table of values was required to determine the characteristics of each correlation function and select a more accurate displacement. The examination was repeated with a new table for each new level. In order to better determine possible displacements from a correlation function, it would be useful to distinguish values of the function representing possible displacements from values of the function not representing possible displacements.

It is therefore an additional object of the present invention to provide new an improved methods of processing values of a correlation function to distinguish values of the function representing possible displacements from values of the function not representing possible displacements.

In accordance with an additional feature of the present invention a method of determining the displacement between a plurality of well logs separately derived from investigating devices passed through a borehole comprises producing first and second data derived from separate investigating devices or from separate passes of the same device through a borehole and determining for a selected sample level a correlation function corresponding to a plurality of displacements between a selected group of samples of the first data and groups of samples of the second data which is assumed as the first assumption to have a predetermined displacement relationship with the group of samples of the first data. The values of the correlation function are compared and some of the values are selected as representing possible displacements between the first data and the second data. The selected values are scaled with a predetermined scale factor to produce scaled values of these selected values substantially different from values not selected. As a further feature, representations of the scaled values for the selected values and representations of the values not selected are displayed for successive sample levels.

Once the correct displacement for various levels has been determined it is necessary to apply these displacements to provide correct sample level alignment. This application employs shifting one group of samples of data by the determined displacement in relationship with the other group of samples of separately derived data. This shifting of data may require delection or repetition of some samples of the shifted data when a difference between adjacent displacement occurs. When difference in displacements are small or deletion or repetition of samples takes place in data which vary slightly in value, there is little change in the nature of the shifted data. However, when large differences in displacements are applied abruptly to shift data, particularly where values of the data to be shifted are varying rapidly, the nature of the shifted data can be adversely changed by deletion or repetition of distinctive samples of the shifted data.

It is therefore a further object of the present invention to provide new an improved methods of distributing differences between displacements to minimize changes in the nature of well logging data when the well logging data is shifted to provide correct sample level alignment.

In accordance with a further feature of the present invention, a method of determining displacements between a plurality of well logs separately derived from investigating devices passed through a borehole comprises producing first and second data derived from separate investigating devices or from separate passes of the same device through a borehole and determining for a first sample level, a displacement between a first selected group of samples of the first data and a corresponding first group of samples of the second data which is assumed, as a first assumption, to have a predetermined displacement relationship with the first group of samples of first selected data. Similarly for a second sample level, a determination is made of a displacement between a second selected group of samples of the first data and a corresponding second group of samples of the second data which is assumed, as a first assumption, to have a predetermined displacement relationship with the second selected group of samples of first data. The determined displacements and first and second sample levels are compared to determine distributed displacements for intermediate sample levels between the first and second sample levels. The application of these distributed displacements at the intermediate sample levels to shift the data minimizes changes in the nature of the shifted data.

The application described herein in regard to one possible implementation pertains to problems related to the determination of depth displacements between well logging data derived from investigating devices on separate passes through the borehole. Data derived from one pass through the borehole can be assumed, as a first assumption, to have a predetermined depth displacement relationship with data derived from another pass through a borehole. However, the features of the present invention apply as well to the general case of determining the displacement between any two separately derived well logging measurements which have similar correlative information and can be assumed to have a predetermined displacement relationship between the two separately derived measurements.

For a better understanding of the present invention, together with other and further objects thereof, reference is had to the following description taken in connection with the accompanying drawings, the scope of the invention being pointed out in the appended claims.

Referring to the drawings:

FIG. 1 shows an investigating device in a borehole along with apparatus at the surface of the earth for controlling the investigating apparatus and recording the measurements derived therefrom;

FIG. 2 is an example of logs produced from separate passes through a borehole;

FIG. 3 represents the relationship between several parameters used in accordance with the present invention;

FIG. 4B graphically represents correlation factors comprising correlation functions and illustrates certain notations used throughout this specification.

Figure 4A:
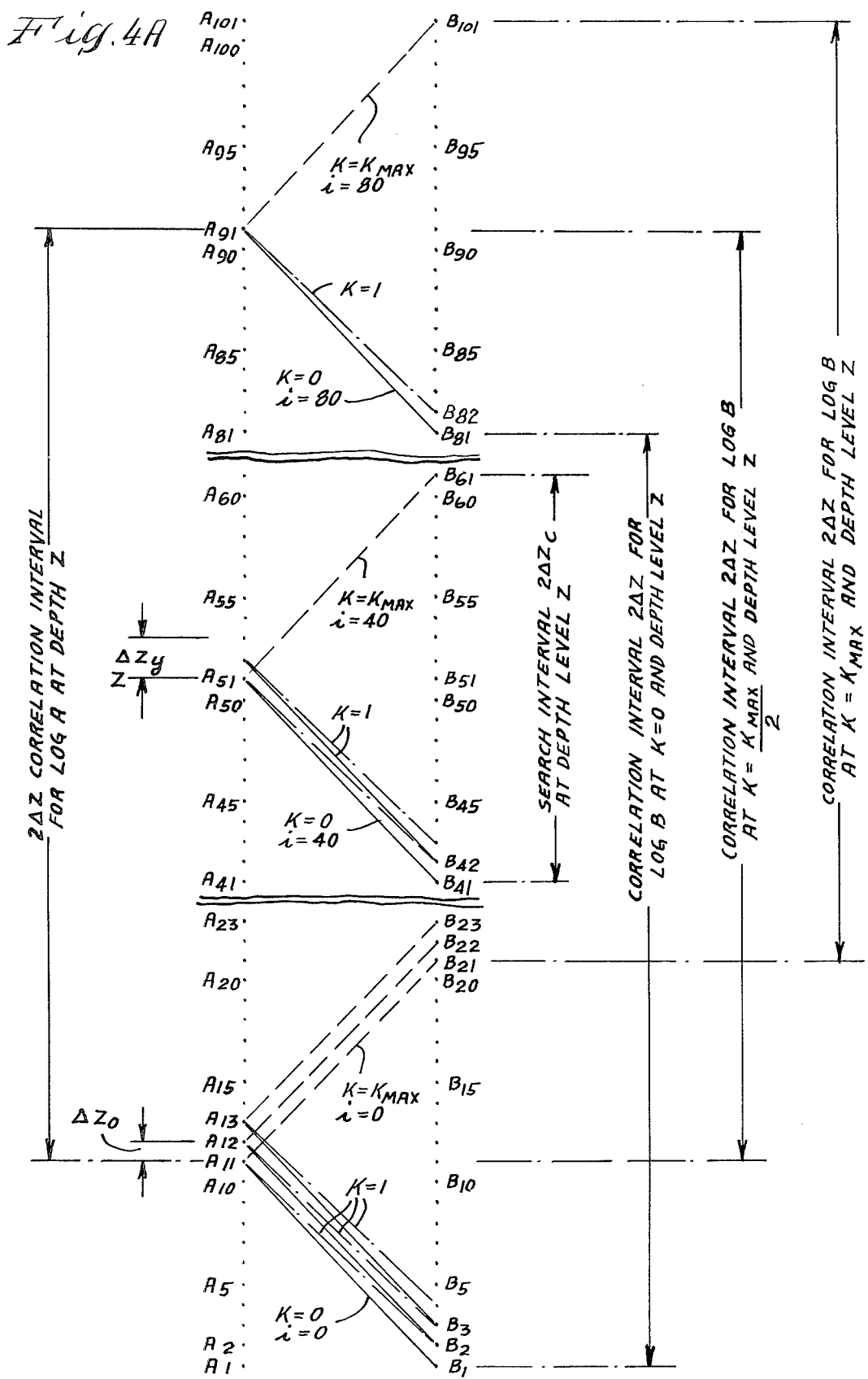
FIG. 4A shows two logs obtained from separate passes through a borehole for purposes of defining certain parameters used throughout this specification.
Figure 4C:
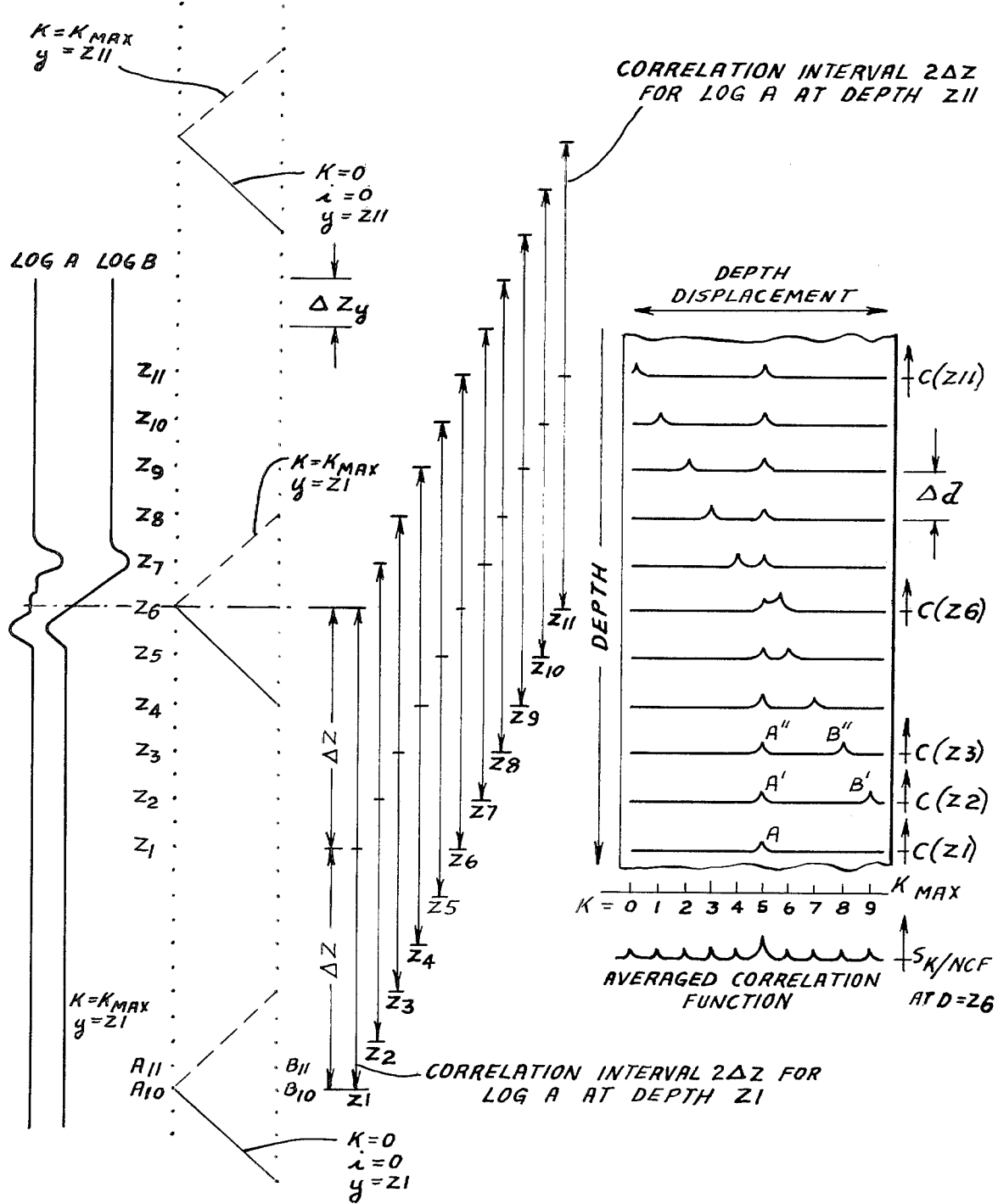

FIG. 4C graphically represents correlation functions obtained for correlation intervals overlapping a feature present on the two logs considered in the correlation function.

FIG. 5 is a table illustrating how depth shifts may be declared and how intermediate depth levels and distributed depth displacements may result;

FIG. 6A, 6B, 6C and 6D show a process flow diagram representation of how the techniques of the present invention might be implemented;

FIG. 7 represents a relationship between values of correlation functions at various depths and representations of selectively scaled values comprising a display that may be derived in accordance with one feature of the present invention.

Now, referring to FIG. 1, there is shown an investigating device 10 in a borehole 11 for investigating subsurface earth formations 12. The investigating apparatus 10 is supported in a borehole 11 on an end of cable 13. The cable 13 passes over a sheave wheel 14 and is secured to a drum and winch mechanism 15. The drum and winch mechanism 15 includes a suitable brush and slip ring arrangement 16 for providing electrical connections between cable conductors and a control panel 17. The control panel 17 operates to supply power and control signals to the investigating apparatus and includes suitable electronic circuitry for receiving well logging measurements from the investigating apparatus and readying such measurements for application to a digital tape recorder 18. The tape recorder 18 and depth recorder 21 are stepped as a function of depth by a driving wheel 19 which engages the cable 13 and mechanical linkage 20.

The investigating apparatus 10 has a reference point 22 which constitutes the center of recording point of the investigating apparatus 10. Because of the long elastic cable 13, the investigating apparatus 10 is subject to displacement arising from cable stretch thus causing the true depth level to be different from the depth level registered by a depth recorder 21 derived from the driving wheel 19. The depth level registered by the depth recorder 21, which is identical with that registered by the tape recorder 18, is designated "Z". When attempting to depthmatch a log produced by the investigating apparatus 10 with the log produced from another investigating apparatus passed through the borehole 11 at a different time, there is a distinct possibility that the logs recorded by the two investigating apparatus at the same depth will not be referenced to the same depth.

Referring to FIG. 2, there are seen two logs, A and B, of the same or similar measurements made during different passes through a borehole. By observation it can be seen that the two logs have similar, though depth shifted, details. Considering the log A as the base log, it can be seen that at the depth level $Z_1$, log B is depth shifted an amount X from log A. The same holds true at depth level $Z_2$. Then at depth level $Z_3$, the two logs suddenly are depth matched, i.e., the depth shift is equal to 0. Then at depth level $Z_4$, the depth shift becomes 3X. When attempting to combine the associated elements of logs produced and recorded on the separate borehole passes A and B of FIG. 2, the results may well be in error because of the lack of depth matching.

It is one purpose of the present invention to utilize two similar logs made from separate passes through the borehole to correlate the depth levels of all logs produced during one pass with all logs produced during the second pass. Such similar logs are considered to be the same log, such a gamma ray log made on the same pass or on two separate passes, similar logs having similar characteristics such as two porosity logs made with different types of investigating devices, or logs which may be initially dissimilar but which can be made to appear similar as by averaging the log or by combining two logs made during one pass to produce a third log for correlation with a log derived from a second pass through the borehole. In any event, this correlation is accomplished by utilizing the log fluctuations of logs A and B to indicate the amount of depth shift of one log relative to the other log.

Turning now to FIG. 3 to define certain terms used herein, there are shown the two logs A and B to be correlated. The presently considered depth level, shown on log A in FIG. 3, is designated Z. This depth level Z for both logs A and B is initially the depth level given by the surface depth registering apparatus. Thus, for data recorded on magnetic tape, it is the depth indicia on the magnetic tape. The depth interval over which data is used to produce the correlation function $C_K$ (to be defined below) is designated the correlation interval, $2\Delta Z$. The depth interval which curves A and B are sampled in the correlation process is designated the sample interval $\Delta Z_o$, as shown in FIG. 3. Thus $2\Delta Z/\Delta Z_o$ is the number of samples in the correlation interval and is designated m. In practice, samples at each end of the correlation interval are included making the number of samples in the group of samples considered in the correlation process n equal to m+1. The maximum amount by which curve B is displaced relative to curve A for any given depth level Z is, as shown in FIG. 3, designated $2\Delta Z_C$. This interval is called the search interval and is divided uniformly into smaller intervals called search steps. After the logs A and B have been depth correlated at the depth level Z, the same process is repeated at a new depth level which is an interval, called the correlation step $\Delta Z_p$, from the presently considered level Z.

As a first step in the depth correlation process, one curve (in this case curve B) is effectively depth shifted one search step at a time relative to the other curve (curve A) and a correlation factor $C_K(Z)$ is computed for each search step to produce a correlation function $C(Z)$ at depth level Z. The search step is for simplicity herein considered to be $\Delta Z_o$, the same as the sample interval, but in practice could assume any value. The equation for computing the elements of the correlation function $C_K(Z)$ could take any desired form. A normalized root mean square equation has been found to give favorable results. An equation of this type is discussed in detail in section 12.4, page 169 of the book, "Introduction to Probability and Statistics" by Henry L. Alder and Edward B. Roessler published in 1964 by W. H. Freeman and Company of San Francisco, Calif. One form of an equation to compute elements of a correlation function is:

$$C_K(Z) = \frac{n \sum_{i=0}^{m} A_{z-l+i} B_{z-h+i+K} - \sum_{i=0}^{m} A_{z-l+i} \sum_{i=0}^{m} B_{z-h+i+K}}{\sqrt{\left(n \sum_{i=0}^{m} A_{z-l+i}^2 - \left(\sum_{i=0}^{m} A_{z-l+i}\right)^2\right) \left(n \sum_{i=0}^{m} B_{z-h+i+K}^2 - \left(\sum_{i=0}^{m} B_{z-h+i+K}\right)^2\right)}} \quad (1)$$

where A and B are the values of the two logs:

i is the sample interval number and increases between 0 and m where m is equal to $2\Delta Z/\Delta Z_o$;

K is the displacement number of log B relative to log A in samples and increases between 0 and $K_{MAX}$ such that $K_{MAX}\Delta Z_o$ is the search interval $2\Delta Z_c$;

$\xi$ is the correlation step number in samples and corresponds to the depth level Z;

h is a depth offset for log B in samples and is equal to $(\Delta Z + \Delta Z_c)/\Delta Z_o$;

l is a depth offset for log A and is equal to $\Delta Z/\Delta Z_o$;

$C_K(Z)$ is the correlation factor for the displacement value of K at a depth level Z; and n is the number of samples in the group of samples used in computing the correlation factor and is equal to m+1.

These parameters will be described in detail later.

Turning now to FIG. 4A, it will be described how the computation of the correlation function $C_k$ takes place. In FIG. 4A, there are shown the sample points versus depth for two logs A and B. The log values for the successive sample points for the two logs A and B are designated $A_1$, $A_2$, $A_3$, etc., and $B_1$, $B_2$, $B_3$, etc. Common subscripts for the logs A and B indicate common initial depth levels as they would be recorded as derived from the exploring devices run through the borehole. For example, the log value $A_1$ is initially assumed to be on depth with the log value $B_1$. Now, assume in FIG. 4A that log A and B at depth level Z are to be correlated. In this case, assuming log A to be the base log, that point on the log B which corresponds in true depth with the same point on log A at depth level Z is to be found and shifted, if necessary, to the depth level Z. Desirably, after such shifting, the data sample of log B which was derived from the same true depth as the data sample of log A at depth Z is now referenced to the depth level Z.

To accomplish this, a plurality of correlation factors $C_k(Z)$, are computed for given values of K between 0 and $K_{MAX}$ for the depth level under consideration Z to produce a correlation function C(Z) where, as discussed earlier, K is the displacement number in samples. Since the search step is equal to $\Delta Z_o$, each increase of K by 1 will correspond to $\Delta Z_o$ depth shift on the log. For each value of K, $C_k(Z)$ is computed over the correlation interval $2\Delta Z$ from i=0 to i=m. Desirably, the correlation interval $2\Delta Z$ is substantially greater than the search interval $2\Delta Z_c$. Although it is not necessary that the depth interval between each sample used in producing the correlation factors $C_k(Z)$ be the same as the search step used in producing the correlation function C(Z) (i.e., that $\Delta Z_o$ be the interval for both i and K), such has been done for this example to simplify the illustration.

To explain how the correlation operation takes place, an example of such an operation will be described using FIG. 4A. Assume that $\Delta Z_o$ is 6 inches, $\Delta Z_y$ is 12 inches, $\Delta Z$ is 20 feet, $\Delta Z_c$ is 5 feet and the first depth level to be correlated is that given by sample $A_{51}$. Furthermore, assume that the interval between successive data samples in FIG. 4A is 6 inches, e.g., $A_1$ to $A_2$ and $B_1$ to $B_2$ is 6 inches. In this situation both Z and $\xi$ will be initially set to 51 and l will be 40 (i.e., $\Delta Z/\Delta Z_o = 40$), h will be 50 (i.e., $(\Delta Z + \Delta Z_c)/\Delta Z_o = 50$), m will be 80 (i.e., $2\Delta Z/\Delta Z_o = 80$) and n will be 81 (i.e., m+1).

The first step is to compute $C_k(Z)$ for K=0 and Z=51. To accomplish this, in accordance with equation (1), $C_k(Z)$ for K=0 is computed taking into account all i's from i=0 to i=m. Thus, for each term, initially, i is set equal to 0 and the A and B values combined in accordance with equation (1); then i is set equal to 1, 2 ... m in turn whereupon the condition i=m, the value of each term is complete. The values of the terms are then combined per equation (1) to produce $C_k(Z)$ for K=0. Taking the values given above for the A.B product term, for example, for K=0 and i=0, $A_{\xi-l+i}=A_{51-40+0}=A_{11}$ will be combined with $B_{\xi-h+i+K}=B_{51-50+0+0}=B_1$ to evaluate the first A.B product term; for i=1, $A_{12}$ with $B_2$ ..., and so on until i=m which is equal to 80, $A_{51-40+80}=A_{91}$ with $B_{51-50+80+0}=B_{81}$. The solid lines running between the A and B log values in FIG. 4A represent, for a few exemplary cases, how log A and log B values are combined for the condition K=0 to produce the A.B product terms of equation (1) for summation. For the individual A and B summation terms $$\left( \text{e.g. } \sum_{i=0}^{m} A_{z-l+i} \right),$$

the A and B log values for n values of i between 0 and m are accumulated. Thus for K=0, $A_{11}$ to $A_{91}$ are summed and $B_1$ to $B_{81}$ are summed. Similarly the individual A.A, B.B and A.B product terms are summed. Then, all of the product summation terms and individual A and B summation terms are combined in accordance with equation (1) to produce $C_k(Z)$ for K=0. In FIG. 4A, the log B correlation interval $2\Delta Z$ for K=0 at depth level Z is shown. Log B over this depth interval is combined with log A over its correlation interval $A_{11}$ to $A_{91}$. This log A correlation interval is the same for all values of K for K=0 through K=$K_{MAX}$ at depth level Z.

Next, K is incremented by 1 and $C_K(Z)$ for K=1 computed in the same manner. Thus, considering the A.B product term of equation (1), for K=1, at i=0, $A_{\xi-a+i}=A_{51-40+0}=A_{11}$ is combined with $B_{86-h+i+K}=B_{51-50+0+1}=B_2$; for i=1, $A_{51-40+1}=A_{12}$ with $B_{51-50+1+1}=B_3$; and so on until at i=m, $A_{51-40+80}=A_{91}$ with $B_{51-50+80+1}=B_{82}$. The dash-dot lines running between the A and B logs shows, for a few illustrative log samples, how log A and log B are combined for the condition K=1. The individual A summation terms will be the same for all K's at any given Z since the A terms are not depth dependent on K. However, for the B terms which are depth dependent on K, $B_2$ to $B_{82}$ will be summed for K=1.

This same process is repeated for all K values from K=0 to $K_{MAX}$ which, in this example, is 20. Considering the A.B product term for $K_{MAX}$ (K=20) at i=0, $A_{\xi-l+i}=A_{51-40+0}=A_{11}$ will be combined with $B_{\xi-h+i+K} = B_{51-50+0+20} = B_{21}$; at $i=1$, $A_{51-40+1} = A_{12}$ with $B_{51-50+1+20} = B_{22}$; and so on until at $i=m=80$, $A_{51-40+80} = A_{91}$ will be combined with $B_{51-50+80+20} = B_{101}$. The combination of log A and log B values for the condition $K = K_{MAX}$ is represented in FIG. 4A by the dashed lines. For the B summation terms of equation (1), $B_{21}$ to $B_{101}$ will be used. The log B correlation interval for $K = K_{MAX}$ is shown in FIG. 4A as extending between $B_{21}$ and $B_{101}$ and is combined with log A over its correlation interval $A_{11}$ to $A_{91}$. Also shown in FIG. 4A is the log B correlation interval for $K = K_{MAX}/2$. As seen in FIG. 4A, the depth intervals for logs A and B exactly coincide for $K = K_{MAX}/2$. In other words, the subscripts for A.B product terms used in equation (1) are identical when $K = K_{MAX}/2$ for all i's between 0 and m.

At this point, all $C_k(Z)$ values for K between 0 and $K_{MAX}$ have been computed and C(Z) evaluated between a selected group of samples of log A and selected groups of samples of log B corresponding to various displacements of log B to log A as represented by the displacement number K. The best fit between the two logs at depth level Z normally occurs at that K where C(Z) is a maximum for the correlation factor equation illustrated. In other correlation factor equations, the best fit or highest similarity between the two logs may correspond to the displacement where C(Z) is a minimum. For equation 1, the K where the largest $C_k(Z)$ value $C(Z)_{MAX}$ occurs is designated K'. The corresponding displacement in samples will be $K' - K_{MAX}/2$ since at $K = K_{MAX}/2$, the log A and B values are referenced to common depth levels as stated above. For example and using the value of $K_{MAX}$ and $\Delta Z_o$ given above, if K' is found to be 9, the $K' - K_{MAX}/2$ will be $9 - 10 = -1$, thus indicating that the depth displacement between the two logs at depth level Z is $-1$ sample or $-6$ inches. In this case, the log B value $B_{50}$ will be deemed, as a first assumption, to be that sample of log B which was derived at the same depth level Z as the log A sample $A_{51}$.

From the foregoing, it can be seen that the log B correlation interval is moved relative to the log A correlation interval for different values of K while computing values of $C_k(Z)$ for such different values of K to thereby determine the apparent best correlation or best similarity between the two logs at depth level Z. Once the best similarity is determined, the corresponding depth displacement can be determined. As will be established later, the depth displacement determined by this process is only a first assumption value which may be improved upon.

To determine the depth displacement at the next depth level which is an interval $\Delta Z_y = 12$ inches away (for the present example $Z = Z_0 = 51$), Z is incremented by 2 and the same operation repeated for a new group of samples of log A and a number $(K_{MAX}+1)$ of groups of samples of log B, i.e., $C_k(Z)$ for all K's between 0 and $K_{MAX}$ are computed, etc: to evaluate C(Z) at $Z = Z_1 = 53$. In each case, a depth displacement relationship between log A and log B is assumed as a first assumption, i.e. that the recorded depth levels are correct and no displacement exists.

Now referring to FIG. 4B, $C_k(Z)$ values are graphically represented for two depth levels, $Z = Z_{30}$ and $Z = Z_{31}$. Each correlation factor $C_k(Z)$, corresponding to one displacement between a group of samples of log A and a group of samples of log B, is computed for each displacement K from $K=0$ to $K = K_{MAX}$ and scaled and represented in graphical form to produce a representation of the correlation function at one depth level, herein referred to as a correlogram. The $C_k(Z)$ values are scaled along the ordinate or Y axis of the plot and the displacement number K scaled along the abscissa or X axis of the plot. Each $C_k(Z)$ value is represented as a point on a correlogram curve corresponding to each value of the correlation function C(Z). For example, the value $C_k(Z)$ for $K=0$ and $Z = Z_{30}$ represents the first value of the correlation function $C(Z_{30})$. Similarly the value $C_k(Z)$ for $K = K_{MAX}$ and $Z = Z_{30}$ represents the last value of the correlation function at depth level $Z_{30}$. The maximum value $C(Z)_{MAX}$ of $C(Z_{30})$ is shown as corresponding to $C_k(Z)$ with the $K=5$ and is designated $C(Z_{30})_{MAX}$. The maximum value $C(Z)_{MAX}$ of $C(Z_{31})$ is shown as corresponding to $C_k(Z)$ with $K=6$ and is designated $C(Z_{31})_{MAX}$. It has been found that graphical representations of correlation functions to produce correlograms are useful in the analysis of the characteristics of the correlation function. For example, the graphical representations of FIG. 4B allow the determination for each depth level that a single peak in similarity between the two logs is defined by $C(Z)_{MAX}$ and that the depth displacement corresponding to $C(Z)_{MAX}$ is reliable. By comparison of the correlogram for the correlation function at depth level $Z_{30}$ to the correlogram for the correlation function at depth level $Z_{31}$, it is possible to determine the position of $C(Z)_{MAX}$ as moved from $K=5$ to $K=6$, respectively, representing a change in the depth displacement with depth.

It has been discovered that when graphical representations of normalized correlation functions determined for correlation intervals which substantially overlaps are displayed versus depth, they are useful in determining depth displacements and in analyzing changes in depth displacements at various depth intervals. To provide graphical displays of correlation functions or correlograms versus depth, the origin of a plot is displaced a constant distance $\Delta d$ in a direction parallel to the ordinate or Y axis between each new depth level and correlogram output as shown in FIG. 4B. The distance $\Delta d$ corresponds to the distance between successive depth levels $Z_{30}$ and $Z_{31}$ scaled along the ordinate of the plot. Correlograms for successive depth levels are consequently stacked versus depth. A technique used to provide displays of this type and as shown in FIG. 4C is described in copending U.S. Application Ser. No. 276,348 by J. P. Timmons and J. J. Maricelli filed the same day as the instant application and now abandoned.

Referring to FIG. 4C, there are shown a series of simplified correlograms stacked versus depth illustrative of substantially overlapping correlation functions determined for successive depth levels Z1 through Z11. Also shown in relation to the correlograms are corresponding depth levels and correlation intervals in respect to an illustrative feature present on log A and log B at depth level Z6. As shown by FIG. 4C, the correlation intervals for each successive correlation function substantially overlap adjacent correlation intervals. In other words the correlation interval is much greater than the correlation step $(2\Delta Z > > \Delta Z_y)$. If this requirement is not met, the sense of continuity necessary to follow a given feature in the correlogram will be lost.

Referring now to the correlogram displayed for depth level Z1 and labeled C(Z1) in FIG. 4C, there is shown a single peak denoted as "A" indicating good similarity between log A and log B corresponding to displacement number $K=5$. This is the usually expected correlogram and presents no problem in determining a corresponding depth displacement. However, it has been discovered that the correlation function C(Z) sometimes contains two peaks of nearly equal value indicating good similarity. This is represented by peaks "A'" and "B'" corresponding to displacement numbers for K=5 and K=9, respectively for correlogram C(Z2).

It has been observed that the presence of two or more peaks in a normalized correlation function is associated with some features of logs which do not have exact similarity and particularly when the features result in a change in the mean value of the log under correlation with the base log (i.e. log B at depth level Z=Z6 of FIG. 4C). The values for the correlation function corresponding to depth displacements were such a log feature is included in the ends of the correlation interval for log B but is not included in the correlation interval for log A are adversely affected and sometimes create additional indications of good similarity between the two logs. These additional indications persist despite the use of normalized equations for correlation factors as discussed earlier.

When two indications of good similarity or maximum values are present in a correlation function, it is obvious that there may arise some difficulty in determining the correct displacement for such a correlation function. For example, at depth level Z2, the depth displacement may be determined as corresponding to either K=5 or K=9. Similarly, the depth displcement may be determined as corresponding to either K=5 or K=8 for peaks "A''" and "B''" for depth level Z3. If the depth displacement corresponding to either K=8 or K=9 was used, an incorrect depth displacement would result.

It has been discovered for the case of substantially overlapping correlation functions that such additional indications of similarity usually appear at displacements corresponding to slightly different depth displacements for each overlapping normalized correlation function while the correct indication of depth displacement appears at about the same displacement in each normalized correlation function. Referring again to the display of the stacked correlograms shown in FIG. 4C, the depth displacement of the various B' peaks shift systematically with each successive depth level while the depth displacement of the various A' peaks remains nearly constant.

To further improve the accuracy of the process to determine depth displacements from correlation functions a number of substantially overlapping normalized correlation functions are combined to produce an average correlation function for use in the determination of the depth displacement. To accomplish these values of corresponding elements of a predetermined number of normalized correlation functions determined for substantially overlapping correlation intervals are summed and normalized to determine values of corresponding elements of a compensated correlation function.

Referring again to FIG. 4C, it can be seen by observation that by adding the values of corresponding elements of the correlation functions for depth level Z1 through Z11 (i.e. adding all the $C_k(Z)$ values for K=0 for depth level Z1 through Z11 to produce $S_K$ for K=0), a sum will be produced in which the peaks which have nearly constant depth displacements will be reinforced by combination with corresponding values of the peaks, while the peaks which occur at different depth displacements will be smoothed by combination with correponding values which are not peaks. To accomplish this sum all the $C_k(Z)$ values of like K values for a predetermined number NCF of correlation functions are added to produce a sum $S_K$ for that K value. Let NCF=11 for example, all the $C_k(Z)$ values for K=0 from each of 11 correlation functions, C(Z1) to C(Z11), are added to produce a value for the element $S_K$ for K=0. This process is repeated for each K value from K=0 to K=$K_{MAX}$ to produce corresponding sums for $S_K$ for K=0 to K=$K_{MAX}$. The values of each element of the sum $S_K$ are then normalized by dividing by NCF to produce values of a normalized sum $S_K$/NCF. This normalized sum is representative of the depth level D corresponding to the center of the overlapping correlation intervals. For example, the correlogram designated $S_K$/NCF at D=Z6 in FIG. 4C is representative of the normalized sum of the illustrated correlation functions C(Z) for depth levels Z1 through Z11. As shown, the peak corresponding to the depth displacement where K=5 is now easily determined as the correct depth displacement.

The previous discussion of FIG. 4C illustrates the value of graphically represented correlation functions in analysis of the nature of correlation functions and in determination of depth displacements between the two logs under correlation. It also has been found, that in practice, only that part of a correlation function representative of possible depth displacements is of actual importance. For example, the maximum value or values corresponding to the peaks in the correlogram previously described, are parts of a correlation function representative of possible depth displacements. To further improve the determination of depth displacements from correlation functions, in accordance with an important feature of the present invention, values of a correlation function are compared to select some of the values representing possible depth displacements. The selected values are scaled to produce scaled values for the selected values substantially different than the values not selected. The resulting scale values and values not selected are printed to produce a line of numbers wherein the numbers representing selected values are substantially different than the numbers representing values not selected. The representations for each substantially overlapping correlation function are printed versus the depth to produce a display of correlation functions versus depth.

To accomplish the described display, each value of correlation function is compared with a previously determined value $C_{k(lim)}$. This value may represent the lowest acceptable value of $C(Z)_{MAX}$ that may correspond to a possible depth displacement. For example, the value may correspond to 60% of the value representing a perfect correlation or fit of the features of log A and B. If the perfect correlation value was 10, then $C_{k(lim)}$ of 6 may be used. The values greater than 6, as for the above example, are selected and scaled by a predetermined scale factor which results in the scaled value having a substantially different magnitude than values not selected. In the above example, a scale factor or scale of 10 may be employed to produce a scaled value of 60 for a selected value of 6, while values not selected, such as 5, would remain unscaled and have a substantially different magnitude. Further, values of the correlation function may be compared with other values of the same function to select values defining features such as the maximum or minimum values for the function. To accomplish this comparison, maximum and minimum values are initially defined as much smaller and larger values than would be expected for the maximum and minimum $C_k(Z)$ values, respectively. For the previous example, the value for the maximum, herein designated MAX, may be initially defined as $-20$ and the value for minimum, herein designated MIN, may be initially defined as $+20$. Each $C_k(Z)$ value from $K=0$ to $K=K_{MAX}$, is compared in turn with the value then assigned to MAX and MIN. In the comparison for the maximum value, if $C_k(Z)$ exceeds the current MAX value, the MAX value is re-defined as $C_k(Z)$. In the comparison for the minimum value, if $C_k(Z)$ is smaller than the current MIN value, the MIN value is re-defined as $C_k(Z)$. In both the MAX and MIN re-definition cases, the displacement number K for $C_k(Z)$ is recorded as KMX and KMN, respectively. After all values of the function have been compared, the last definition of KMX and KMN define K for the $C_k(Z)$ values selected as the maximum and minimum values, respectively. These selected $C_k(Z)$ values are then scaled with a predetermined scale factor to produce scaled values substantially different in magnitude than the values not selected as the maximum or minimum values. For the previous example, the maximum may have had an original value of 9. Since it was selected as corresponding to a possible depth displacement it is consequently scaled to 90. If it has also been selected as a maximum, it is now scaled with a predetermined scale factor of perhaps 10 to produce a scale value of 900. Similarly the minimum value would be increased in magnitude but would retain the negative sign where appropriate. However, it is possible that neither the maximum nor minimum magnitude value is large enough to be considered as a possible depth displacement in which case no scaling would occur.

Referring to FIG. 7 there is shown a first set of two lines of numbers marked A and B and a second set marked A' and B'. The lines A and B of the first set correspond to the values of illustrative correlation functions for depth levels 934 and 938, respectively, printed as shown in correspondence with a few of the displacement numbers K from $K=1$ to $K=9$ and from $K=12$ to $K=19$. As indicated by the figure, normally the values for all K's would be printed although some are omitted here. In this example, the value corresponding to a perfect correlation or match is 1,000 while a value of $-1000$ would correspond to a perfect anti-correlation or mismatch. Careful examination of the numbers may determine the maximum and minimum values and the positions of the values in excess of 600, here to be considered the minimum value required to represent a possible depth displacement.

Referring now to FIG. 7, lines A' and B' are the corresponding lines for the same depth levels 934 and 938, respectively. The values in lines A and B between $-600$ and $+600$ now appear at 1/100th their original value (i.e. one character only) in lines A' and B' while the values in lines A and B that are over 600 (exclusive of sign) in lines A and B appear as 1/10th their original values (i.e. two characters) in lines A' and B', with the exception of the maximum and minimum values. These latter two values have been scaled by a scale factor (10, for example) large enough to produce more characters than is provided in the print space. An output routine detects this problem and inserts a special symbol, here a "$" sign for negative numbers and a "*" for positive numbers, as the leftmost character and fills in the remaining characters with the most significant numbers of the value to be printed. This feature is usually available on most Fortran formatting routines. The special characters are unique to the maximum and minimum values while two character numbers are unique to values selected as corresponding to possible depth displacements. Accordingly, single character numbers correspond to values not selected as possible depth displacements. In the foregoing example all values were scaled as a result of a choice of scale for the original range of values (all correlation factor values were previously scaled by 1000). However, the important feature, in accordance with this invention, is that some values were selected and scaled to provide representatives which have substantially different scaled values than for those values not selected. By printing the representatives from successive depths (e.g. 934 and 938) adjacent to each other a display of correlation functions versus depth is obtained where the distance $\Delta d$ between each line is a scale of $\Delta z_y$.

Unfortunately, there are factors which may give numerically low $C(Z)_{MAX}$ values. For example, a bad log reading caused by a malfunction in the investigating apparatus, or noise, can cause low $C(Z)_{MAX}$ values. To prevent an erroneous depth displacement indication upon such an occurrence, $C(Z)_{MAX}$ is compared with a number $C_{k(lim)}$ representing the lowest acceptable value of $C(Z)_{MAX}$ and if $C(Z)_{MAX}$ is lower than $C_{k(lim)}$, the corresponding depth displacement is disqualified. If $C(Z)_{MAX}$ exceeds $C_{k(lim)}$, the depth displacement is qualified for further consideration.

Discarding of all such disqualified depth displacements it not sufficient to prevent occasional errors in a depth correlation process. To improve the accuracy of depth displacement determination, a history file of qualified depth displacements is produced and utilized to statistically improve the accuracy of the depth correlation process. To accomplish this, a prescribed number of qualified depth displacements with values within prescribed tolerances at successive depth levels are required before an average depth displacement is determined as representative of depth levels in the history file. Once an average depth displacement is determined, it takes a prescribed number of qualified depth displacement with different values but still within prescribed tolerances before a new average depth displacement will be determined as representative of depth levels in the latter history file. It has been found that differences in values between such average depth displacements, even though often smaller than the differences between unaveraged depth displacements, are sometimes on the order of one or more feet. These large differences may accumulate over depth intervals where no satisfactory correlation could be found. Therefore the average depth displacement determined at one end of such an interval does not accurately represent the depth displacements over the interval. Further, as discussed earlier, depth shifting of the data may require deletion or repetition of some data when a difference between adjacent depth displacements occurs. It has been found that when large differences in depth displacements are applied abruptly shift the data at depth levels where the data values are varying rapidly, the nature of the shifted data may be adversely changed by deletion or repetition of distinctive values of the data.

To further improve the accuracy of the determination of depth displacements, in accordance with an important feature of the present invention, intermediate depth levels and distributed depth displacements at these intermediate depth levels are produced to minimize change in the nature of the shifted data. To accomplish this, average depth displacements are determined from statistical history files representative of two depth levels. The distance between the two depth levels and the difference in values of the corresponding average depth displacements are determined. This distance and difference are combined to determine a depth displacement distribution function which determines an intermediate distance corresponding to one increment of depth displacement. A number of intermediate distances are combined with one depth level to produce an intermediate depth level. A corresponding number of incremental depth displacements are combined with the corresponding average depth displacement to one depth level to produce a distributed depth displacement for application at the corresponding intermediate depth level.

Before considering the determination of a statistical history file and average depth displacement in detail, it would first be desirable to consider some definitions. The computed depth displacement or depth shift at any given level Z is designated SH(Z), the declared depth displacement is designated $SH_D$, and the stored depth displacement is designated SHS. The number of declared depth displacements for a given history is designated HC (for history counter). The required tolerance between consecutive qualified depth shifts is designated TOL. The number of consecutive (depthwise) occurrences of qualified depth displacements within prescribed tolerances is designated UDC. The average depth displacement is designated SHA.

The prescribed value of UDC, necessary to cause an average depth displacement to be determined, is designated $UDC_{MIN}$. The depth level corresponding to the first declared depth shift is designated DCS. The intermediate depth level is designated DPS and the corresponding distributed depth displacement is designated SHF (for Shift Final). The minimum distance allowed between distributed depth displacements, (to prevent abrupt changes if a large difference in depth displacement occurs over a short interval) is designated $\Delta ZS$. The number of depth levels considered for each history file is designated LEVEL.

Turning to FIG. 5 there is shown a table giving representative values of an illustrative example of how depth displacements may be declared and an average depth displacement may be determined. Each line in FIG. 5 is considered to be a separate depth level or depth D. Assume that $UDC_{MIN}=3$. Furthermore, assume that TOL=6" and $\Delta Z_y = \Delta ZS = 12"$ corresponding to two samples. Here $\Delta ZS$ is set equal to $\Delta Z_y$ for purposes of simplicity but this need not always be the case. Since $\Delta Z_y$ is 12" and $\Delta Z_o$ is 6", as discussed earlier, depths between each correlation level increment by two. For FIG. 5, as shown in the footnote, a "*" indicates additional depths not listed here or considered in a history file because $C(Z)_{MAX}$ did not exceed $C_{K(lim)}$, as discussed earlier. At the beginning of the correlation process, UDC is set to 0 and DPS is set to the start depth as indicated by FIG. 5.

At the first depth level D=51 the corresponding qualified depth displacement SH(Z)= -12". This displacement is accepted into the history file without further consideration, since there are no prior displacements for comparison. The history file is started by setting UDC=1 (it was initially set=0). The first accepted depth shift (depth displacement) is stored as SHS(1) as indicated by the entries in the table. The dashed entries for SHS(Z) through SHS(UDC) indicate values not yet defined in the history file. Since this first shift was accepted into the history file, it was also declared as $SH_D$. $UDC_{MIN}$ occurrences of qualified depth displacements within ±TOL are required before an average depth displacement can be computed so SHA and SHF also remain undefined. DPS was defined as D=51 initially.

The second depth level or depth D corresponds to D=53 and SH(Z)= -6". In order to be accepted into the history file, SH(Z) must agree with $SH_D$ within a specified tolerance TOL, as previously discussed. Since -12 and -6 are within the specified tolerance, (±TOL=±6), this level is accepted into the file, UDC is incremented to 2 and SH(Z) stored as SHS(2) to be used later in computing the average depth displacement. The blanks for the line D=53 indicate no new definitions for the previously defined values, SHS(1) and DCS. Finally, SH(Z) is declared as the new $SH_D$ value -6.

As indicated by the "*", depths 55 through 61 have $C(Z)_{MAX}$ less than or equal to $C_{K(lim)}$ and are disqualified for consideration for the history file. Depths 63, 65, 67 and 69 had qualified depth displacements and are considered. Depth 63 has SH(Z)=12 which is compared with $SH_D$ of -6 but is found outside the required tolerance. Since this represents a discontinuity in the required continuous agreement within the specified tolerances, a new history file is started as indicated by UDC being reset to 1, DCS to D, SHS(1) to SH(Z) and $SH_D$ to SH(Z). No final shift SHF at depth DPS has yet been determined because $UDC_{MIN}$ histories were not found. At depth 65, SH(Z)=6 which is within required tolerances of $SH_D$=12, so is accepted as the second entry into the history file and SHS(2) and $SH_D$ set to 6. At depth 67, SH(Z)=0, which is also within required tolerances of $SH_D$ of 6, so is accepted as the third entry (UDC=3). However, since $UDC_{MIN}$ is also 3, the required number of qualified depth displacements are now available to determine an average depth displacement.

The average depth displacement is determined by adding previously stored shifts SHS and the current shift SH(Z) (e.g. for UDC MIN=3, SHS(1)+SHS(2)+SH(Z)=12+6+0=18) and dividing by UDC, the number of shifts combined (e.g. 18/3=6). Thus SHA=6 is defined and since this is the first average depth displacement, SHF=SHA=6. DPS is now determined and represents the first depth for distribution of this depth displacement and future depth displacements. The depth level DPS is representative of SHA, and is defined as the depth level corresponding to the first accepted shift for this history file, as stored in DCS, extended backward by a distance corresponding to one correlation step $\Delta Z_y$. In this case $\Delta Z_y$ corresponds to $\Delta Z_y/\Delta Z_o = 2$ samples and DPS=DCS−$\Delta Z_y/\Delta Z_o$=63−2=61. The two values, DPS=61 and SHF=6, are then output as denoted by lines under these values in FIG. 5. To complete the processing of this level DCS is set to D=67 and SH(Z) is stored as SHS(UDC)=SHS(3)=0. As indicated by the break between the column in the table for SHS(2) and SHS(UDC) in FIG. 5, $UDC_{MIN}$ values greater than 3 may also be used requiring additional accepted shifts which are stored in SHS(3), SHS(4), etc. to SHS(UDC) and employed in the average depth displacement determination.

SH(Z) of 6 at D=69 is also accepted as within tolerances of the last SH$_D$ of 0 and UDC is increased by 1 to 4. However, since this level is an extension of the same history file, SH(Z) is stored only in SH$_D$ and DPS is now updated to D, corresponding to an upward extension of the depth representative of the file. The same logic applies to depth 73 even though several unqualified levels were not considered.

At depth=81, SH(Z)=0 which represents an abrupt change from the SH$_D$ value of 12. This abrupt change is outside the required tolerances for continuing the history file. As in such previous cases, a new history file is started by setting UDC to 1, DCS to D, storing SH(Z) as SHS(1) and declaring SH$_D$=SH(Z). The same process occurs for depth=83 but for depth=89 and 91, SH(Z) is accepted completing another history file. The average depth displacement is again determined and now SHA=(−36/3)=−12 which is substantially different than the last average depth displacement (stored as SHF=6). Abrupt application of such a difference in depth displacements (between +6 and −12) to shift data may cause substantial change in the nature of the shifted data as previously discussed. It is therefore desirable to distribute this difference over intermediate depth levels between the depth levels representing the two average depth displacements. Accordingly intermediate depth levels at 75, 79 and 81 are determined to apply distributed depth displacements of 0, −6 and −12 respectively.

The intermediate depth levels may be determined by the following procedure. The distance between the first depth level DPS=73 and the second depth level DCS=83, extended backward by one correlation step $\Delta Z_y/\Delta Z_o$ as before is determined (e.g. DCS−DPS−$\Delta Z_y/\Delta Z_o$=83−73−2=8). The difference in depth displacement between the first average depth displacement and the second average depth displacement is determined in sample units (e.g. (SHA−SHF)/$\Delta Z_o$=(6−(−12))/6=18/6=3). If this difference is small (1 sample for example), the difference is applied at DCS, extended backward by one correlation step as before. If this difference is large, as in this case, a depth displacement distribution function STEP is determined as the ratio of the distance just determined over the difference just determined (e.g. (DCS−DPS−$\Delta Z_y/\Delta Z_o$)/(SHA−SHF)/$\Delta Z_o$=8/3=2). Note here fractional values are not retained. This STEP is compared with a minimum allowed values $\Delta ZS$, here expressed also in samples, $\Delta ZS/\Delta Z_o$. In this case both STEP and $\Delta ZS/\Delta Z_o$ values are two so the value of STEP is not changed. Otherwise STEP would be increased to $\Delta ZS/\Delta Z_o$. The first intermediate depth level is determined by adding one STEP value to the last DPS value (e.g. DPS=DPS+STEP=73+2=75). Similarly one increment of depth displacement, here $\Delta Z_o$ is combined with appropriate sign, here negative, to the last SHF value (e.g. SHF=SHF+$\Delta Z_o$=6+(−6)=0). This first set of intermediate depth levels and distributed depth shifts in then output as indicated by the lines under 75, for DPS, and O, for SHF at D=91.

Subsequent sets of DPS and SHF values are determined by adding corresponding numbers (here 2 for the second set) of STEP values and $\Delta Z_o$ values to DPS and SHF respectively e.g. DPS=13+2(2)=73+4=77 and SHF=6+2(−6)=6−12=−6). These values are also output as indicated and the process continues until only one increment of difference in displacement between SHF and SHA remains. The last intermediate depth level is determined by extending the DCS value backwards as before (e.g. DPS=DCS−$\Delta Z_y/\Delta Z_o$=83−2=81). The distributed depth displacement is the last average depth displacement, SHA=−12, and the distribution of the difference in depth displacement is complete.

Depth 93 continues the current file with UDC=4 and illustrates the updating of SH$_D$ to SH(Z) and DPS to D. Depth 95, with SH(Z) of −6, starts another history file reaching, as described before, the required UDC$_{MIN}$ value at depth=101. Here the difference in SHA and SHF is small (=6″) and the SHF value is applied at DCS extended backward (DPS=DCS−$\Delta Z_y/\Delta Z_o$=93) as previously discussed.

FIGS. 6A through 6D represent the invention as it can be performed on a general purpose digital computer of a suitable size and configuration such as an IBM 360/65 of conventional configuration. The log data input may be via digital tapes recorded on digital tape recorder 18 shown in FIG. 1 or, through alternate input, as disclosed in the previously referenced Tinch et al application. Each of the steps of the detailed flow diagrams depicted in FIGS. 6A through 6D may be directly translatable into any of a number of standard computer programming languages such as Fortran or P1/1 and used to program a digital computer to perform the data processing steps shown in the figures.

Now turning to FIGS. 6A, 6B, 6C and 6D, there is shown a flow diagram depicting a representative implementation of the techniques of the present invention. First, refer to FIG. 6A. After the depth correlation routine is entered (element 30), the various parameters used by the program are read as represented by element 31. This includes the designation of the logs A and B which are to be used in the correlation process. If desired, several additional logs may be designated for inclusion in the correlation with Log A. Also included are the above discussed constants $C_{K(lim)}$, $\Delta Z$, $\Delta Z_o$, $\Delta ZS$, $\Delta Z_y$, $\Delta Z_C$, and UDC$_{MIN}$ as well as a depth interval $\Delta Z_{Avg}$ representing a depth interval over which log B can, if desired, be averaged. Additionally, the lowest and highest depth levels to be corrected, designated $Z_a$ and $Z_b$ respectively, are read, i.e., the depth interval over which the depth correlation is to be performed. Also included are NCF, designating the number of correlation functions to be combined, and TOL, the required tolerance for acceptance into the history file.

Next, as represented by a block 32, the log data A over the depth interval $Z_a-\Delta Z$ to $Z_b+\Delta Z$ is read and the log data B over the interval $Z_a-\Delta Z - \Delta Z_C$ to $Z_b+\Delta Z+\Delta Z_C$ is read. Next, as represented by the decision element 33, a decision is made as to whether log B is to be averaged and if so, as represented by block 34, it is averaged using the averaging interval $\Delta Z_{Avg}$. If log B is not to be averaged, block 34 is by-passed. Since the FIG. 6A flow diagram has provisions for averaging only the log B, that log which is not to be averaged will always be considered as log A in block 31. If desired, both logs A and B could be averaged.

Now with the values of logs A and B over the necessary depth intervals stored in memory, the correlation process is ready to begin. As a first step, it is convenient to compute the constants used in equation (1) and previously discussed. This is represented by block 34A were l, h, m, n and K$_{MAX}$ are determined from previously defined relationships with $\Delta Z$, $\Delta Z_o$ and $\Delta Z_C$. Now Z and DPS are set equal to $Z_a$ and $\xi$ is set equal to its initial value, as represented by block 35. As discussed earlier, $\xi$ is the depth sample number and represents a given sample of data in memory. Initially, $\xi$ will be equal to $(\Delta Z + \Delta Z_C)/\Delta Z_o + 1$ if the data samples for the first depth level considered are $A_1$ and $B_1$. Then as represented by block 36, NOP, NC, UDC, i and K are set equal to 0.

Now, $C_k(Z)$ for all values of K can be computed using equation (1) over the depth interval $Z - \Delta Z$ to $Z + \Delta Z$ for log A where initially Z is equal to $Z_a$. To accomplish this operation is the function of elements 37, 37A, 37B and 37C in FIG. 6A. As represented by element 37, $C_K(Z)$ is computed using equation (1) where initially $K = 0$ to produce values of a normalized correlation function $C(Z)$. The operation depicted by block 37, of course, includes a number of individual steps which are not shown in FIG. 6A since it is well known how to perform such an operation. Briefly, such an operation could be implemented essentially as was described in connection with FIG. 4A. Namely, i could be incremented one unit at a time to accumulate the appropriate $A_{\xi-l+i}$ and $B_{\xi-h+i+k}$ values to produce the $$\sum_{i=0}^{m} A_{z-l+i} \text{ and } \sum_{i=0}^{m} B_{z-h+i+K}$$

terms of equation (1) and the appropriate $A_{\xi-l+i}$ and $B_{\xi-h+i+K}$ terms multiplied together and accumulated to produce the $$\sum_{i=0}^{m} A_{z-l+i} \cdot B_{z-h+i+K}$$

term of equation (1). These accumulated terms can then be combined with n in accordance with equation (1) to produce normalized values of $C_K(Z)$ for this K and Z.

Once $C_K(Z)$ is computed, it is determined if $K = K_{MAX}$ as represented by decision element 37A. If not, i is reset to 0 and K is incremented by 1, as represented by blocks 37B and 37C. The program then returns to block 37 to compute a new $C_K(Z)$ for this K. The program continues around this loop until $C_K(Z)$ is computed for all K's from $K = 0$ to $K_{MAX}$. Once $C_K(Z)$ for $K = K_{MAX}$ has been computed, all values for the correlation function $C(Z)$ at depth Z are defined, and the answer to the question asked by decision element 37A is yes. The program proceeds to block 37E which corresponds to an important feature of the present invention—the combining of overlapping normalized correlation functions to produce an improved correlation function. In this case $C(Z)$, as determined in blocks 37A, 37B, 37C, is replaced with an accumulated average of up to NCF previous $C(Z)$ values. The operation depicted by block 37E has been previously discussed and will now be described in detail in regard to FIG. 6B.

Figure 6H:
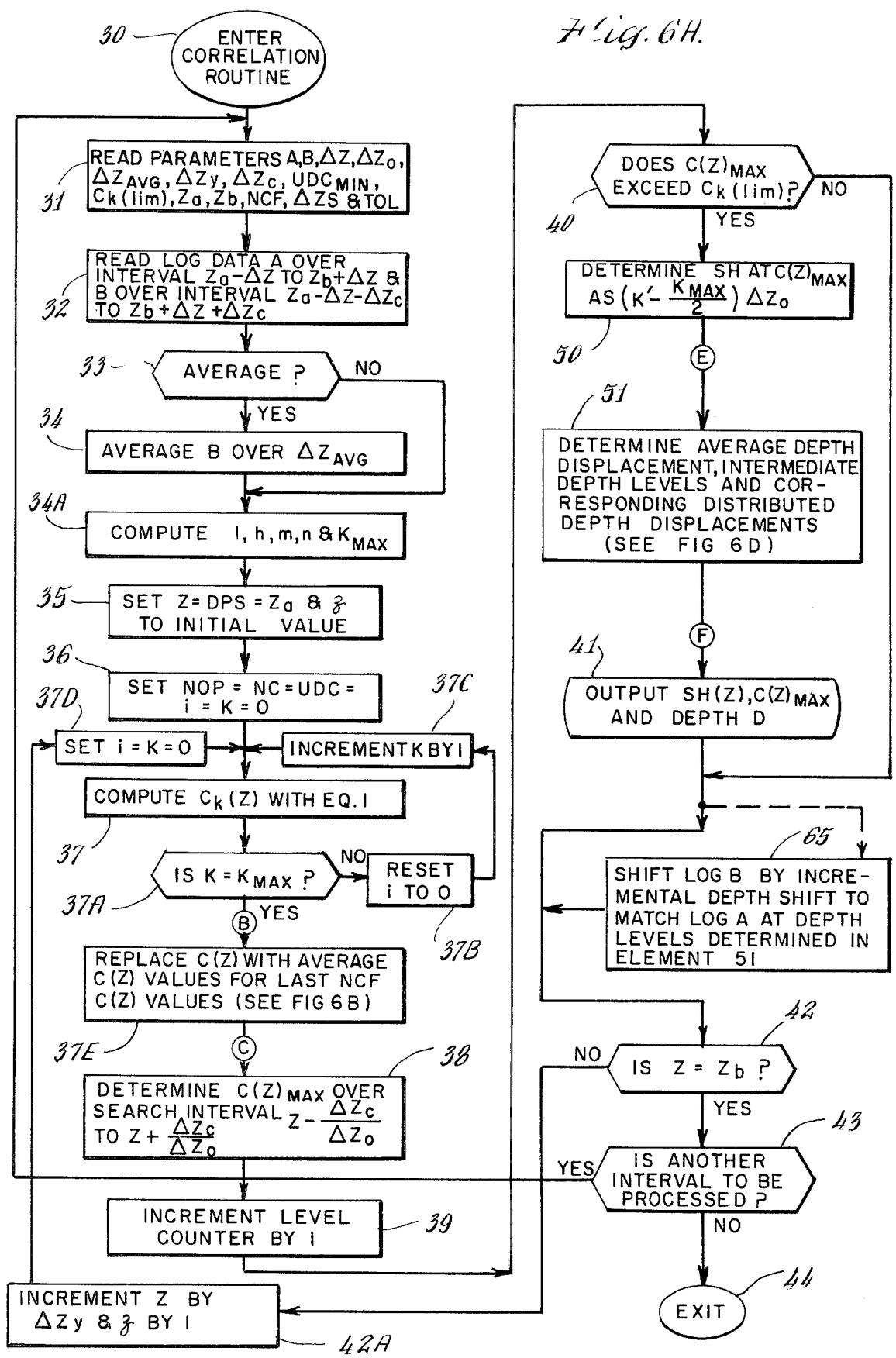

FIG. 6B corresponds to one method of implimenting the steps depicted between point B and C indicated in FIG. 6A. Referring now to FIG. 6B, points B and C refer to the same points on FIG. 6A and correspond to the entry and return points of the correlation function averaging procedure. Starting then, as indicated by decision element 140, the test for $NC = 0$ is answered YES on the first time the procedure is entered, as this was the initial NC definition as per block 36, FIG. 6A. The procedure which follows, and is represented by blocks 141 through 144, is used to initialize the averaging procedure. Block 141 represents the computation of NCK, the number of correlation factors in each function, which is equal to $K_{MAX} + 1$. In the process of averaging, a sum of corresponding correlation factors for up to NCF correlation function is first determined. Block 142 represents the setting of this sum $S_k$ to an initial value 0, for $K + 0$ to $K = K_{MAX}$. NC is now used to count the number of correlation functions received by the procedure, NCS is used to count the number of correlation functions summed into $S_k$ and LS is used to locate one of NCF storage arrays, STORE (LS) for $LS = 1$ to NCF, used to store the last NCF correlation functions $C(Z)$. As indicated by block 143, NC, NCS and LS are set to 1 for the first $C(Z)$ received.

When averaging a number of overlapping $C(Z)$ values, the depth Z is not representative of the average interval. Consequently, as adjusted depth D must be computed which represents the center of the overlapping correlation intervals in the average. For the first interval, $D = Z$, as indicated by the next block 144.

Proceeding with block 145, the values of $C_K(Z)$ for the current $C(Z)$ values are placed in the storage array indicated by LS, such that STORE (LS) = $C(Z)$ for all NCK elements (e.g. $K = 0$ to $K = K_{MAX}$ as $i = 1$ to $i = NCK$ since $K = i - 1$). The technique for placing or transferring values for like elements of one array to like elements of another array is similar to that described in computing $C_K(Z)$ values in block 37 of FIG. 6A. The technique is not described herein since it is also well known. This technique is also used in the case of adding values for like elements of $C(Z)$ to like elements of $S_K$ for $K = 0$ to $K_{MAX}$ as depicted by the next block 146.

Proceeding to block 147, this same technique is used to compute new values for like elements of $C(Z)$ from like elements of $S_K$. Each value for like elements of the new $C(Z)$ is computed by dividing the value for like elements of $S_K$ by NCS for all values of K from $K = 0$ to $K_{MAX}$. If desired, the functions of blocks 145, 146, and 147 may be combined and each like element of $C(Z)$, STORE (LS), $S_K$ and the new $C(Z)$ could be processed for one value of K as $K = 0$, for example, then another value of K as $K = 1, 2,$ etc. through $K_{MAX}$.

The last block before returning to point C is to output the adjusted depth D and the new values for $C(Z)$ as indicated by block 148. In one form, these output values are simply stored on tape or disc or like storage for later use, perhaps as input to an additional procedure, such as the history file and averaging depth displacement procedure also described herein, but now without the necessity of recomputing these values. In another form the output is used by an additional procedure previously described herein and also described in conjunction with FIG. 6C as indicated in FIG. 6B.

On subsequent entries to the correlation function averaging procedure, NC is not 0 so the test represented by block 140 is answered NO and the procedure moves to block 150. Here the counter NC is incremented by 1 from $NC = 1$ to 2, for the second case, indicating a second $C(Z)$ value has been received. Then as indicated by block 151 through 154, a short procedure is started to compute a cyclic number pattern. This procedure is used to cyclically redefine a storage array indicater LS in cycles which repeat every NCF times.

For a better understanding of this procedure refer to Table I, of FIG. 6B. Here an illustrative table of values is given, corresponding to values of NC, MOD—as determined in the function of block 151, and LS—as determined by blocks 152, 153, and 154. For the first line in the table, where NC=2, MOD=⅔=0, as fractional values are not retained by the truncation process used by the integer arithmetic representative of block 151. For block 152, LS=NC−MOD ×NCF (e.g. LS=2−0×3=2). Since LS is not 0, the test indicated by block 153 answers NO, and this value is not changed by block 154. However, for line 3 where NC=3, MOD=3/3=1 and now LS=3−1×3=0, as shown in Table I. This case is detected by the test indicated by decision element 153 answering YES, and LS is set to NCF=3, as indicated by block 154. This latter step is not shown in Table I. As shown by Table I, LS repeats cyclically the values 1, 2, 0; 1, 2, 0; etc., for NCF=3. Each time LS=0 it is reset to NCF as previously described producing a final cycle of values 1, 2, 3, 1, 2, 3; etc. In actual practice NCF is usually much larger. (It is suggested NCF should be an odd number such as 11). An illustrative table for NCF=11 would be unnecessarily long, but this illustrated method works equally as well.

Once a LS value is obtained, the process moves to the test indicated by decision element 155 where which method of adjusting depth D to be used is determined. This test answers NO if NC is less or equal to NCF and the next process is indicated by block 156. For the example where NC=2 and NCF=3, this test answers NO and NCS is set to NC=2, as indicated by block 156, to reflect the correct number of C(Z) values combined for use in computing the average as indicated in block 147. The next process, as indicated by block 157, is to adjust depth D by ½ the correlation step $\Delta Z_y/\Delta Z_o$, as the center point of the averaged correlation intervals will advance at one half the amount the usual depth level Z advances until NCF values of C(Z) are obtained. On the other hand when the test depicted by block 155 answers YES, indicating NCF values of C(Z) have been obtained, the adjusted depth advances by the usual step $\Delta Z_y/\Delta Z_o$ as shown by block 160.

In the case where NCF values of C(Z) have already been obtained and summed into $S_K$, the oldest C(Z) value, as stored in STORED (LS), must be subtracted from $S_K$ for K=0 to $K_{MAX}$, as indicated by block 161, to produce a continuously running sum of the last NCF values of C(Z). This type of procedure for substracting values of like elements is well known and not described herein. In the case of NC greater than NCF, NCS remains equal to NC=NCF, as was the condition when the test depicted by block 155 last answered NO.

As shown in FIG. 6B, processing branches from block 157 or block 161 back to block 145. In the present case where NC=2 and LS=2, the values of C(Z) are stored in the second storage array STORE (2); for the case where NC=3 and LS=3, C(Z) is stored in STORE (3); and assuming NCF=3 for the case where NC=4, LS=1, as indicated by table 1, so C(Z) is stored in STORE (1). The process completes by the steps indicated by blocks 146 through 148 which have been previously described. Each time the correlation function averaging routine is called, NC is advanced by 1, a new LS is computed, the depth D adjusted, the old store (LS) subtracted from $S_K$, the current C(Z) value stored in STORE (LS) and added to $S_K$ and a new C(Z) computed equal to the average of the last NCS values of C(Z). Each resulting C(Z) is then used in place of the normal C(Z) value in the process depicted by FIG. 6A and may also be further processed as output in the operation indicated by block 148 in reference to FIG. 6C.

The operation indicated by the flow diagram of FIG. 6C, is an important feature of the present invention. This operation comprises comparing values of a previously defined correlation function C(Z) to select some of these values as representing possible depth displacements, scaling the selected values with a predetermined scale to produce scale values for those selected values which are substantially different than the values not scaled. Outputting, as one line, these scaled values for selected values, and the values not selected on a device such as the line printer produces indications for those values selected as representing possible depth displacements which are substantially different than for those values not selected. The output occurs for each successive overlapping correlation function producing a display of selectively scaled correlation functions versus depth. Three types of features for C(Z) are selected as representing possible depth displacements. All elements with values greater in magnitude than $C_{K(lim)}$ are selected and scaled according to the first scale. The maximum and minimum values of C(Z) are selected and scaled according to the second scale. The second scale is such to produce special symbols for the maximum and minimum values when they are formated for printing.

Referring back for the moment to FIG. 6B to a point D after block 147 and to a point C after block 148, these same points are shown as points D and C in FIG. 6C and correspond to the the entry and return points, respectively, for the process depicted in FIG. 6C and now described.

Each time the procedure depicted in FIG. 6C is entered at point D, I is set to 1, MAX to −2000, and MIN to +2000 as indicated by block 101. This initializes the procedure for a comparison of each value of C(Z), here designated $C_K(Z)$, with the previous value of MAX for possible selection as a new MAX and similarly with previous value of MIN for possible selection as a new MIN. Then the absolute value of $C_K(Z)$ is compared with $C_{K(lim)}$ for possible selection as exceeding $C_{K(lim)}$ and therefore representing a possible depth displacement. Those $C_K(Z)$ values selected are scaled to produce values substantially different from those $C_K(Z)$ values which are not selected. Here in this example, the range of values for C(Z) corresponds to 1000 for perfect correlation and −1000 for perfect anticorrelation. As depicted in block 101, the initial value −2000 for MAX is set less than any possible value for $C_K(Z)$ and the initial value for MIN is set greater than any possible value for $C_K(Z)$.

With decision element 102, the comparison procedure starts by comparing $C_K(Z)$ with MAX, as indicated by the test shown in decision element 102, to determine if $C_K(Z)$ corresponds to a possible maximum value. For the first case where i=1 (see block 101), K=i−1=1−1=0, and $C_K(Z)$ for K=0 is tested. If $C_K(Z)$ exceeds MAX, the test answers YES, and MAX is then redefined as $C_K(Z)$ for k=i−1. In addition K is recorded as KMX. These last two operations are depicted in block 103. On the other hand, if $C_K(Z)$ does not exceed MAX, the test of block 102 answers NO, and the old value of MAX and KMX remains.

As depicted in decision element 104, the next operation in the procedure is to perform a similar comparison to determine if $C_K(Z)$ is a possible minimum value by comparing it with MIN. As indicated by decision element 104, if the test for $C_K(Z)$ is less than MIN answers YES, MIN is redefined as $C_K(Z)$ for K=i−1 and K is recorded as KMN, as indicated in block 105. On the other hand if $C_K(Z)$ is greater than MIN, the test answers NO and the old value for MIN and KMN remains.

Proceeding then in any case to the function of block 106, the absolute value of $C_K(Z)$ for $K=i-1$ is obtained by techniques well known and is used to define ACK. ACK is then tested for exceeding $C_{K(lim)}$ as indicated by decision element 107. If the test answers NO, the value does not represent a possible depth displacement and is scaled as indicated by block 108 by first scale (here 1/100).

Referring now to FIG. 7, as previously described, lines A and B are examples of values of correlation functions where a perfect correlation equals 1000. Consider for example line A for $D=934$, where $K=1$ and $C_K(Z)=-100$. In this example, $ACK=|-100|=100$, which answers NO in the test depicted by element 107. It is therefore scaled as indicated by block 108 by 1/100 and used to define N(K) for the current value of K. In this case $N(K)=-1$, the value given for line A', $D=934$ and $K=1$ of FIG. 7. Note, the sign remains.

For an additional example from FIG. 7, consider line A, $D=934$ for $K=15$ where $C_K(Z)=609$. Accordingly, $ACK=609$ which answers YES in the test depicted by element 107. $C_K(Z)$ is then scaled, by 1/10, as indicated by block 109 and used to define N(K) for the current value of K. In this case, N(K) equals 60, the value given for line A', $D=934$ and $K=15$ of FIG. 7. It is in this manner that values for $C_K(Z)$ are selectively scaled to produce corresponding values for N(K). When the N(K) values are listed as in line A' and B' of FIG. 7, the N(K) values corresponding to $C_K(Z)$ values selected as possible depth displacements are displayed as having substantially different values from those N(K) values corresponding to $C_K(Z)$ values not so selected. In this example, the selected values are a factor of 10 larger than those not selected. Representations for selected values appear as two characters each, while representations for those values not selected appear as a single character.

Referring again to FIG. 6C and proceeding to block 110, i is imcremented by one in preparation for the test of the decision element 111. The comparison and selective scaling process depicted by elements 102 through 110 are repeated for all values of i from $i=1$ to $i=NCK$ as controlled by the test indicated in the decision element 111. NCK is the number of values in C(Z) as described in reference to block 141 of FIG. 6B. As long as this test answers NO, the next value of C(Z) is processed until finally, when all values are processed, i exceeds NCK and the test answers YES. In this case, the process continues as represented by block 120.

As previously described, readily available computer output routines for formating values provide the ability to detect values larger than can be fit into the number of character positions specified in a format. When excess characters exist, a special character ("*" for positive values, "$" for negative values) is set into the most significant character and remaining characters are filled with the most significant characters of the value. For example, if the value 1000 is requested to be formated into three characters (usually designated as an I3 format), the three characters "*10" would result. The functions of block 120 and 121 utilize these features by scaling values selected as the maximum and minimum values to produce such excess characters.

In reference to block 120, the maximum value of C(Z) and corresponding N(K) value will be indicated by the K recorded in KMX by the procedure previously described. Therefore excess characters may be created by multiplying N(KMX) by 1000. For example, consider the value given in FIG. 7, line A, $D=934$ for $K=17$ where $C_K(Z)=890$. Since this value exceeded $C_{K(lim)}$ of 600, it was scaled as depicted by block 109 by 1/10, and used to define $N(17)=89$. Now assuming it also was determined to be a maximum value as recorded by $KMX=17$. Now, in the operation depicted by block 120, if this N(KMX) value is multiplied by 1000, a value of 89000 will result, which requires more than 3 characters to print. The formating procedure will place a "*" in the leftmost character denoting these excess characters and, starting with the "8" and proceeding to the right, fill the remaining characters of the prescribed format. For the example, if the format is I3, a "*89" results as shown in the corresponding position of line A' of FIG. 7. For the next operation, as depicted in block 121, same procedure is followed for N(KMN) except that a "$" character is used. Then as shown in block 122, a depth D and NCK values for N(K) from $K=0$ to $K=K_{MAX}$ are printed in one line, as represented by line A' or B' of FIG. 7. Since each line represents a correlation function from a successive depth interval, the distance between each line corresponds both to the correlation step interval $\Delta Z_y$ and its scaled graphical counterpart $\Delta d$ as shown in FIG. 4C. After printout, the process returns to point C of FIG. 6A. The process continues to the operation depicted by block 38 of FIG. 6A to determine the displacement number K' corresponding to where C(Z) is a maximum over the interval $Z-\Delta Z_C$ to $Z+\Delta Z_C$ as indicated by K from $K=0$ to $K=K_{MAX}$. As represented by block 39, the LEVEL counter is then incremented by 1. Next it is determined if $C(Z)_{MAX}$ exceeds $C_{K(lim)}$ as represented by decision element 40 and if not, this level is disqualified and it is next determined if Z is equal to $Z_b$, as represented by decision element 42. If $Z<Z_b$, the program increments Z by $\Delta Z_y$ and $\xi$ by 1. The program then returns to element 37D to determine the depth shift SH for the next depth level. If Z is equal to $Z_b$, it is determined if another interval is to be processed as represented by decision element 43, and if so, the program returns to the elements 31 and 32 to read a new group of samples of data to correlated another interval of log data. If another interval is not to be processed, the program exits the depth correlation routine as per element 44.

Returning to the decision element 40, if $C(Z)_{MAX}$ exceeds $C_{K(lim)}$, the depth displacement is qualified for consideration in a history file. The depth shift SH at the depth level presently under consideration, i.e., SH(Z), is determined in accordance with the relationship $SH(Z)=(K'-K_{MAX}/2)\Delta Z_o$ as represented by block 50. The next operation is to enter the procedure for determining average depth displacements, intermediate depth levels and corresponding distributed depth displacements. These steps are indicated by block 51 between point E and point F of FIG. 6A. The procedure depicted by block 51 is described in detail in reference to FIG. 6D. The points E and F of FIG. 6A are the same points E and F of FIG. 6D and correspond to the entry and return points respectively for the above procedure.

Figure 6D:
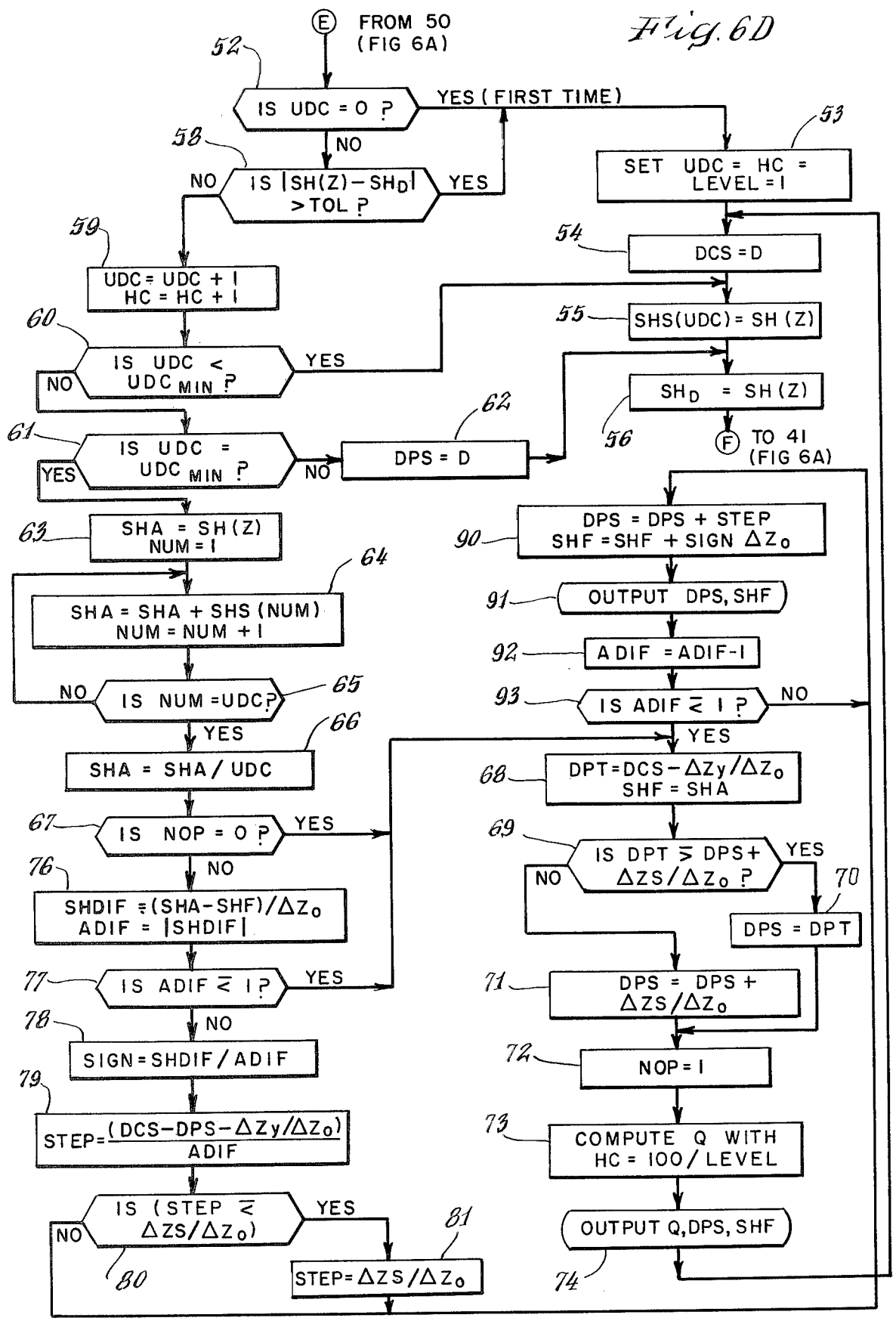

Now referring to FIG. 6D and beginning with decision element 52, UDC is tested for $UDC=0$ and found to answer YES on the first entry, since UDC was initialized to 0 by the function represented by block 36 of FIG. 6A. Consequently, counters UDC, HC and LEVEL are all set to one as represented by block 53 indicating receipt of the first depth displacement, qualified by $C(Z)_{Max}$ greater than $C_{K(lim)}$ as per block 40 of FIG. 6A, and the start of a history file.

In conjunction with the start of a history file, a representative depth D is stored as DCS as indicated by the next block 54. This depth D is used when replacing the original C(Z) values with average correlation function because, in this case Z does not always represent the center depth of the average correlation interval. In place of Z, an adjusted depth D is computed as per blocks 157 or 160 of FIG. 6B. In the case where unaveraged correlation functions were employed, depth Z could be used.

The procedure used in creating a history file and computing average depth displacements has been previously described in reference to FIG. 5. The procedure used to determine intermediate depth levels and distributed depth displacements have also been described in regard to FIG. 5 and corresponds to one possible embodiment of an important feature of the present invention. Both procedures will be described here in regard to FIG. 6D. In order to compute the average depth displacement, it is necessary to store past shift history in storage arrays set aside for this purpose. These storage arrays are designated SHS. As previously discussed, a predefined number $UDC_{Min}$ of depth shifts SH(Z), consistent within a specified tolerance TOL, will be necessary before the average depth displacement will be determined. Accordingly, and as indicated by block 55, the first shift SH(Z) is stored in SHS(1) (UDC=1, as per block 53). As the last operation before return to point F, the accepted shift SH(Z) is declared as $SH_D$ for future use in comparing the subsequent SH(Z) values.

On subsequent entries to point E, UDC is not O and the test of decision 52 answers NO. In this case, the process next determines if SH(Z) is within prescribed tolerances TOL, as indicated by decision element 58. The test may be performed by taking the absolute value of the difference between SH(Z) and $SH_D$ (defined from a previous history) and comparing this to TOL. This technique avoids the complexity of algebraic signs. If this absolute value exceeds TOL, the test answers YES and this SH(Z) value is not accepted into the previous history file but starts a new history file, as indicated by returning the process to block 53.

However, if on the other hand, the test described in regard to element 58 answers NO, the counters UDC and HC are incremented by one, as indicated by block 59. The next step, as indicated by block 60, is to test if the required number of histories $UDC_{MIN}$ have been obtained. If UDC is less than $UDC_{MIN}$, the test answers YES, and the procedure branches to store this SH(Z) value, as indicated by block 55 and SH(Z) is declared as $SH_D$ as per block 56. If, however, the test answers NO, indicating that UDC is at least equal to $UDC_{MIN}$, the process continues as indicated by block 61. The test indicated in decision element 61 checks for each time UDC equals $UDC_{MIN}$, as at this time, as indicated by a YES answer, the average depth displacement SHA can be computed. If the test answers NO, the current depth D is stored as DPS, as per block 62, and the process branches back to block 56.

Referring now back to element 61, a YES answer causes the start of the accumulation of the current depth displacement and stored depth displacements to derive a sum of these displacements. This process is the function of elements 63, 64, and 65. First, as per block 63, SHA is defined initially as SH(Z) and NUM set equal to 1, indicating the first sum of UDC required depth displacements. As per block 64, SHA is updated by adding the first stored displacement SHS(1) to the previous SHA value and NUM is counted by one. This latter process continues as controlled by the test indicated by decision element 65 until a YES answer is obtained for the test of NUM=UDC. Otherwise, as indicated by a NO answer, the process branches back to block 64 and subsequent values of SHS(NUM) are combined (e.g., SHS(Z), SHS(3), etc.) until UDC displacements are added to SHA. When this summing process is completed, NUM=UDC and SHA is divided by UDC to produce the actual average depth displacement, as per block 66.

The next block is indicated by decision element 67 where NOP is tested for its initial definition O, (see block 36 of FIG. 6A). If NOP=0, the test answers YES and the process continues as indicated by block 68. This condition of NOP denotes no previous history (i.e., this is the first average displacement determination), and this first average value is processed without distribution. As per block 68, a trial depth DPT is calculated by extending the depth corresponding to the first entry in the history file DCS backward by a distance equal to one correlation step $\Delta Z_y$, here expressed as $\Delta Z_y/\Delta Z_o$ samples. The assumption is that at this backward extended depth, since no qualified depth displacements were obtained at this depth, few, if any, distinctive values for log B existed at this depth. For this reason, changes of depth displacements at this depth are not likely to change the nature of the shifted data. For the first case, SHA is used as the final shift SHF, since no other values of SHA existed at this time.

Decision element 69 indicates a check to determine if DPT exceeds DPS, extended upwards by a minimum allowed distance $\Delta ZS$, previously defined as an input value. In this test $\Delta ZS$ is converted to samples by dividing $\Delta ZS$ as $\Delta Z_o$, and this number of samples is added to DPS to extend DPS upwards for comparison with DPT. If DPT exceeds $DPS + \Delta ZS/\Delta Z_o$, the test answers YES. This is the case for the first execution of this procedure, as DPS was initially defined as Z (see block 53 of FIG. 6A), which is much less than DCS. DPT is then used to redefine DPS, as per block 70.

If, on the other hand, when DPS has been defined by a previous distributed depth displacement procedure, and the test indicated by element 69 answers NO, this indicates that DPT is closer to DPS than permitted by the $\Delta ZS$ specification, and intermediate depth levels must be adjusted upward by $\Delta ZS/\Delta Z_o$ samples, as indicated by block 71. This adjustment is necessary to avoid undesirable application of depth displacements at depth levels which are too close.

After DPS is determined, either as per block 70 or 71, NOP is set to one, as per block 72 to signify an average depth displacement has now been determined and is available for consideration in a future determination of distributed depth displacements and intermediate depth levels. Proceding then as indicated by block 73, a quality factor Q is computed from HC multiplied by 100, to give percentages, and divided by LEVEL. As previously discussed HC counts the number of levels accepted into the current history file, while LEVEL (incremented for each correlation function, as per step 39 of FIG. 6A) counts all levels even if disqualified by the comparison $C(Z)_{MAX}$ with $C_{K(lim)}$, as per block 40 of FIG. 6A. Thus Q represents the percentage of levels that have been accepted into the history file as compared to the total number of levels computed since the start of the history file. Q is useful in determining the reliability of the depth displacements used to compute the average depth displacement.

The process continues, as indicated by FIG. 6D, with the output of DPS, SHF and Q. This output may be subsequently used as input to shift log B to align the data with log A, as previously described, in the event it is not desirable to do this operation at this time. In any case, it is desirable to retain this information to avoid recomputation should the information be required for a later use.

As indicated by FIG. 6D, the process branches now to blocks 54 through 56 which have been previously described. Now that a first history file is complete, subsequent entries with SH(Z) values within tolerances continue to be counted by UDC and HC. When UDC exceeds $UDC_{MIN}$, the test indicated by decision element 61 answers NO, and the process branches to the operation depicted by blocks 62 and 56 where D is stored in DPS and SH(Z) declared as $SH_D$. The updating with DPS corresponds to extending the depth representing the last history file upward with each acceptable SH(Z). The updating of $SH_D$ by SH(Z) allows the last acceptable SH(Z) to be used for comparison with the next accepted SH(Z).

In the event that subsequent SH(Z) values should exceed the allowed tolerances, the test indicated by element 58 answers YES, and a new history file is started by the operations depicted by blocks 53, 54, 55, and 56, previously described. When the subsequent history file is complete, as indicated by UDC again equaling $UDC_{MIN}$, a new value of SHA is computed, as previously described, but now the test indicated by element 67 answers NO (NOP having now been set to 1 indicating the determination of a prior SHA value) and the process representing one possible embodiment of an important feature of the present invention begins.

At this point, SHF corresponds to a depth displacement for a first depth level DPS and SHA corresponds to a depth displacement for a second depth level DCS. Accordingly, and as indicated by block 76, the two depth displacements are compared by computing the difference between the current average depth displacement SHA and the previous average depth displacement (stored as SHF). Here this difference SHDIF is expressed in samples by dividing (SHA−SHF) by $\Delta Z_o$. For convenience in handling the logic concerning the algebraic sign, the absolute value ADIF of this difference is also determined.

Now proceeding to decision element 77, the test for AD1F=1 is made. If the test answers YES, only one increment of depth displacement exists between SHA and SHF. This incremental distance cannot be further distributed and is treated as the value of SHA at depth level DCS, extended backward as before, as indicated by branching to the process indicated by blocks 68 through 74 and 53 through 56 corresponding to operations previously described.

In the case of large differences in depth displacements, ADIF will exceed one, the test indicated by element 71 will answer NO, and the process of determining intermediate depth levels and corresponding distributed depth displacements will continue as indicated by block 78. Intermediate depth levels will be determined at depths corresponding to levels with poor correlation factors, indicating lack of significant changes in values for the log data. The distributed depth displacement will be of one incremental change each to minimize changes in the nature of shifted data caused by deletion or repetition of more than one sample of data at each intermediate depth level.

Now returning to block 78 of FIG. 6D, as indicated by block 78, the direction of the change of displacements from SHF to SHA, here designated SIGN, is computed by dividing SHDIF by its absolute value ADIF. This operation results either in a +1 or −1. Then proceding as indicated by block 79, the depth displacement distribution function STEP is determined by computing the distance between DCS, extended backwardly as before by $\Delta Z_y/\Delta Z_o$, and DPS and dividing this distance by the previously determined difference ADIF. STEP corresponds to the distance required for distributing each increment of depth displacement. This value may be tested against a minimum allowed for such distances, here expressed as $\Delta ZS/\Delta Z_o$ samples. If STEP is less than the minimum distance, the test indicated by element 80 answers YES and STEP is increased to this minimum value, as indicated by block 81. Otherwise, STEP remains unchanged and the process continues as indicated by block 90.

Intermediate depth levels may be computed by adding increasing numbers of the distance STEP to depth level DPS. Similarly the corresponding distributed depth displacement may be computed by combining the same increasing numbers of the increment of depth displacement $\Delta Z_o$ to SHF. They may also be computed by equivalent alternate methods such as subtracting STEP from DCS, for example.

Block 90 corresponds to adding one STEP value to DPS to produce a new DPS and adding one $\Delta Z_o$ value (with appropriate SIGN) to SHF to produce a new SHF. As shown by block 91, this intermediate depth level DPS and distributed depth displacement SHF are then output to tape, disc or like storage media for possible subsequent application, perhaps in depth shifting log data. If desired, these values could be retained for application at this time.

The next process, as shown by block 92, is to subtract one increment from the different ADIF, and as shown in decision element 93, to test if one or less increments remain. If the test answers NO, further intermediate depth levels and distributed depth displacements result by branching back to the process indicated by blocks 90 through 93, already described. This procedure is repeated until only one increment remains, as indicated when the test indicated by element 93 answers YES. This last increment is processed by the procedure indicated by blocks 68 through 74 and previously described. After output as indicated by block 74, DCS, SHS(UDC) and $SH_D$ are updated, as indicated by blocks 54, 55, and 56, before returning to point F of FIG. 6A.

As previously described, FIG. 5 shows numerous examples of SH(Z) and D values entered and processed by the above described procedure to produce values of UDC, DCS, SHS(UDC), $SH_D$, SHA, DPS and SHF. The values of DPS=61 and SHF= +6 at D=67 correspond to a first depth level and depth displacement. The values of DPS=75, SHF=0, DPS=77, SHF=−6; and DPS=81, SHF=−12 correspond intermediate depth levels and distributed depth displacements, respectively.

Now referring to FIG. 6A at the return point F from FIG. 6D, block 41 indicates the next operation, the output of SH(Z), $C(Z)_{MAX}$, and depth D. This brings the process to the same processing point as the level where $C(Z)_{MAX}$ did not exceed $C_{K(lim)}$ disqualifying the depth displacement as previously described. Normally the process will continue, as depicted by elements 42 etc., and previously described.

The above-described operation has produced numerical outputs giving the depth displacements between the two logs A and B at each depth level. (See element 41.) A log analyst could then shift the log B relative to log A by the indicated amount by a suitable technique. Alternatively, the program could automatically shift the log B by the distributed depth displacement SHF to match the log A at the appropriate depth level DPS. This operation is depicted by the element 65 in FIG. 6A and is described in detail in the previously referenced D. H. Tinch et al application.

Summarizing the depth displacement determination depicted in FIGS. 4A, 4B, 4C, 5, 6A, 6B, 6C and 6D, the two logs to be correlated are initially considered to be depth matched in accordance with the depth indicia on the magnetic tape on which the log data is recorded. Beginning at the initial depth level $Z_a$, a first assumption value of the depth displacement is computed between log A and log B at each desired depth level from $Z_a$ to $Z_b$ in increments of $\Delta Z_y$. Thus, log A is considered to be the base log and the displacement for log B relative to log A is computed. Of course, log A may not be accurately depth referenced itself but when combining logs for computational purposes to achieve better well log interpretation data, the depth correlation between the combined logs is the most important item.

Concerning the displacement determination process at one level, log B is effectively shifted one step $\Delta Z_o$ at a time and a normalized correlation factor $C_K(Z)$ is computed between two groups of samples of data at each such step with equation (1). Once $C_K(Z)$ for all groups of samples over the entire search interval $2\Delta Z_C$ are computed and a correlation function $C(Z)$ is defined for one level, $C(Z)$ for successive levels are accumulated and averaged with a predetermined number of $C(Z)$ values previously determined for substantially overlapping correlation intervals to produce a new correlation function compensated for various adverse effects. The compensated function is then used as $C(Z)$ to determine that K which produced the maximum value of $C(Z)$. The corresponding displacement is then qualified by requiring $C(Z)_{MAX}$ to exceed $C_{K(lim)}$. This prevents use of poor quality correlations in determining the displacement.

Qualified displacements are accepted into a history file if they compare within prescribed tolerances with previously accepted depth displacements. Once a predetermined number of consecutive displacements are accepted an average displacement and a representative level is determined. Subsequent history files are started when qualified displacements are not accepted into a current history file. When a predetermined number of consecutive displacements are accepted into a subsequent history file, a subsequent average displacement and representative level are determined. Intermediate levels and corresponding distributed displacements are then determined to distribute the difference between the average displacements over the distance between the representative levels. Applying these distributed displacements over several levels avoids undesirable changes in the nature of the data that occurs otherwise when large changes in displacements are applied abruptly at a single level to shift the data.

To further determine accurate displacements, values of the correlation functions are compared with $C_{K(lim)}$ and those values which exceed $C_{K(lim)}$ are selected as representing possible displacements. These selected values are scaled by predetermined scale to produce scaled values which are substantially different from values not selected. The maximum and minimum values are also selected and scaled to produce scaled values which are substantially different from values not selected as a maximum or minimum value. The resulting values are then output to produce a display where selected values are represented as having different numbers and types of characters than values not selected. By so doing values corresponding to possible displacements are distinguished from values not corresponding to possible displacements. Successive processing produces successive displays for each level providing a display of the possible displacements versus the dimension used to determine each level, depth for example. There has been described a technique for accurately correlating log data produced from separate investigating devices or from separate passes of the same device through a borehole. This has been accomplished by taking similar groups of samples of log data from each device or from the same device on separate passes through the borehole and matching them through a correlation technique. The validity of this technique has been strengthened by use of average normalized correlation functions determined from substantially overlapping intervals to provide compensation for certain adverse effects. To provide for further analysis and validity in the determination of accurate displacements, there has been described a technique for producing a display of correlation functions. When this technique is applied to display correlation functions determined for successive levels, a display versus the dimension used to determine such levels (i.e. depths) is produced. There also is provided a technique for distributing large changes in the determined displacements preventing undesired deletion or repetition of significant samples of data in the process of shifting data for changes in the displacements.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of this invention.

What is claimed is:

1. In the art of well logging, a method of producing an improved well log by filtering a well log to reduce erroneous depth displacements thereof relative to a base well log comprising the following machine—implemented steps:

a. producing a selected well log derived from an investigating device passed through a borehole in a subsurface earth formation and a base log derived from the same or a different investigating device passed through the same or a different borehole in the formation, each of said logs comprising samples taken at successive initially indicated borehole depth levels;

b. combining groups of samples of the base log and the selected log to produce, for each of a succession of initially indicated borehole depth levels, a group of normalized indications of fit each of which is related to the degree of fit of a span of the base log and a span of the selected log at a respective depth displacement therebetween;

c. wherein the selected groups of samples of the base log associated with successive initially indicated borehole depth levels substantially overlap with each other in terms of borehole depth and the respective groups of normalized indications of fit similarly overlap each other in terms of borehole depth;

d. combining at least some of said groups of overlapping normalized indications of fit to produce improved groups of indications of fit; and e. using said selected well log and said improved groups of indications of fit to filter erroneous depth displacements of the selected well log relative to the base well log and to produce a tangible representation of the resulting filtered selected log.

2. The method of claim 1 wherein the step of combining normalized indications of fit comprises accumulating a predetermined number of overlapping groups of normalized indications of fit to produce a sum thereof and scaling said sum by said predetermined number to produce an averaged group of indications of fit resulting from the use of overlapping successive groups of samples of said base log.

3. The method of claim 2 wherein said overlapping successive groups of samples each overlap at least half of each adjacent group of samples of said base log to produce at least three overlapping groups of normalized indications of fit for use in producing said sum.

4. The method of claim 3 wherein the step of using said selected well log and said improved indications of fit includes determining erroneous depth displacements between said base log and selected log from said averaged indications of fit.

5. The method of claim 4 wherein the step of using said selected well log and said improved indications of fit includes effectively aligning said selected well log with said base well log according to said determined depth displacements.

6. The method of claim 2 wherein each of said overlapping successive groups of samples of said base log substantially overlap each adjacent group of samples of said base well log in terms of borehole depth to produce substantially overlapping groups of indications of fit for use in producing said sum.

7. The method of claim 6 and further including the step of determining a representative level corresponding to the level of the most represented group of samples of said base well log.

8. A well logging method comprising:

a. producing a base well log and a selected well log derived from separate passes of investigating devices through a borehole in an earth formation;

b. finding a group of normalized indications of fit corresponding to a plurality of borehole depth displacements between a selected group of samples of said base well log and selected groups of samples of said selected well log, said last recited groups being assumed, as a first assumption, to be centered at the borehole depth level of said group of samples of the base log;

c. repeating said step of finding a group of normalized indications of fit for each of a number of overlapping successive groups of samples of said base well log to produce a respective number of overlapping groups of normalized indications of fit;

d. combining at least some of said overlapping normalized groups of indications of fit to produce improved indications of fit; and e. using said improved indications of fit to filter said selected well log to reduce erroneous depth displacements thereof relative to the base well log and to produce a filtered selected log.

9. A well logging method comprising:

a. producing first and second well logs derived from separate investigating devices or from separate passes of the same device through one or more boreholes;

b. determining, for a selected sample borehole depth level, indications of fit corresponding to a plurality of displacements between a selected group of samples of said first well log and selected groups of samples of said second well log which are assumed, as a first assumption, to have a predetermined displacement relationship with said group of samples of the first well log;

c. selecting some of said indications of fit as representing possible borehole depth displacements between said first well log and said second well log; and d. scaling said selected indications of fit with a predetermined scale factor to produce scaled indications of fit which are substantially different from non-selected indications of fit;

e. repeating steps (b), (c) and (d) for other selected depth levels in the borehole; and f. filtering the second well log in accordance with said scaled indications of fit to produce a filtered second log.

10. The method of claim 9 wherein the step of selecting indications of fit includes the step of matching said indications of fit with a predetermined threshold and selecting those indications of fit which exceed said threshold as representing possible depth displacements between the first log and the second log.

11. A method of claim 10 wherein said threshold is a selected minimum corresponding to reliable depth displacement fit between said first log and second log.

12. The method of claim 11 wherein the step of selecting indications of fit further includes the step of matching indications of fit with other indications of fit corresponding to the same sample level of the borehole, selecting one of the indications of fit for a given borehole sample level as corresponding to the maximum and selecting another indication of fit for the same borehole level as corresponding to the minimum.

13. The method of claim 12 wherein the step of selecting said maximum and minimum further includes the step of scaling said selected maximum and minimum with a predetermined scale factor to produce scaled indications for said selected maximum and minimum which are substantially different from indications of fit which have not been selected as a maximum or a minimum.

14. The method of claim 13 and further including the step of outputting representations of the scaled indications of fit representing possible depth displacements and representations for indications of fit not representing possible depth displacements to produce a record thereof having an enhanced visual discrimination between said representations of selected and non-selected indications of fit.

15. The method of claim 9 wherein said selected group of samples of the first log for a selected sample borehole depth level substantially overlap the selected groups of samples of the first log for adjacent selected sample levels in the borehole.

16. The method of claim 15 wherein said indications of fit are normalized.

17. A method of well logging signal processing to determine the depth displacements between a plurality of well logs derived from investigating devices passed through one or more boreholes, comprising:
   a. producing first and second logs derived from separate investigating device passes;
   b. producing signals representative of normalized indications of fit corresponding to respective depth displacements between a selected group of samples of said first log and selected groups of samples of said second log, said last recited groups being assumed, as a first assumption, to be derived from depth levels centered as said group of samples of the first log;
   c. testing said indication of fit signals against selected criteria and selecting some as representing possible depth displacements between said first and second logs;
   d. scaling said selected indication of fit signals with a predetermined scale factor to produce scaled signals which are substantially different from the remaining indication of fit signals, and producing a tangible representation of the resulting indication of fit signals in which the distinction between scaled and remaining signals is substantially enhanced.

18. A method of well logging signal processing to determine the depth displacements between a plurality of well logs separately derived from investigating devices passed through one or more boreholes, comprising:
   a. producing first and second logs derived from separate investigating devices or from separate passes of the same device through one or more boreholes;
   b. determining for a first borehole sample level a displacement between a first selected group of samples of said first log and a corresponding first group of samples of said second log which is assumed, as a first assumption, to have a predetermined displacement relationship with said first group of samples of the first log;
   c. determining for a second sample level a displacement between a second selected group of samples of said first log and a corresponding second group of samples of said second log which is assumed, as a first assumption, to have a predetermined displacement relationship with said second selected group of samples of first log;
   d. utilizing said determined displacements for said first and second sample levels to determine distributed displacements for intermediate sample levels between said first and second sample levels and producing a tangible representation of said displacements.

19. A method of well logging signal processing to determine the depth displacements between a plurality of well logs derived from investigating devices passed through one or more boreholes, comprising:
   a. producing first and second logs derived from separate investigating device passes;
   b. determining for a first depth level the depth displacement between a first selected group of samples of said first log and a corresponding first group of samples of said second log which is assumed, as a first assumption, to be centered at the depth level of said first group of samples of the first log;
   c. determining for a second depth level the depth displacement between a second selected group of samples of said first log and a corresponding second group of samples of said second log which is assumed as a first assumption, to be centered at the depth level of said second group of samples of the first log;
   d. utilizing said determined depth displacements at first and second depth levels to determine distributed depth displacements for intermediate depth levels between said first and second depth levels, and producing a tangible representation of said depth displacements.

20. The method of claim 19 wherein the step of determining distributed depth displacements for intermediate depth levels further includes the steps of determining a difference between said determined depth displacements and determining a distance in terms of borehole depth between said first and second depth levels, and combining said determined difference and said determined distance to produce an intermediate depth displacement.

21. The method of claim 20 wherein the step of determining a depth displacement distribution further includes determining therefrom an intermediate distance corresponding to one increment of depth displacement, combining a number of said intermediate distances with said first depth level to determine intermediate depth levels and combining a corresponding number of said increments of depth displacement to determine distributed depth displacements.

22. The method of claim 21 wherein said determined depth displacements are averaged depth displacements for said first and second depth levels, respectively.

23. The method of claim 21 wherein said depth displacement distribution is a ratio of said determined distances and said determined difference.

24. The method of claim 21 and further including the step of outputting representations of said determined distributed depth displacements and corresponding intermediate depth levels for subsequent use in correcting said second log for depth displacement.

25. A method of automatic well logging signal processing to determine possible displacements between a plurality of well logs separately derived from investigating devices passed through one or more boreholes, comprising:
   a. producing first and second logs derived from separate investigating devices or from the same device on separate passes;
   b. determining for a selected sample level, normalized indications of fit corresponding to a respective plurality of displacements between a selected group of samples of said first log and selected groups of samples of said second log, said last recited groups being assumed, as a first assumption, to have a predetermined borehole depth displacement relationship with said group of samples of the first log;
   c. testing said normalized indications of fit against selected criteria and selecting at least one as representing a possible displacement between said first and second logs; and
   d. scaling said at least one selected indication of fit with a predetermined scale factor to produce a scaled version thereof which is substantially different from the remaining indications of fit, and forming a tangible representation of said indications of fit having an enhanced discrimination between the scaled and remaining indications of fit.

26. The method of claim 25 wherein at least one of the indications of fit selected as representing possible displacements between said first and second logs is the maximum valued indication of fit.

27. The method of claim 25 wherein at least one of the indications of fit selected as representing possible displacements between the first and second logs is the minimum valued indication of fit.

28. The method of claim 25 and further including the steps of determining for an additional selected sample level values of additional normalized indications of fit corresponding to respective displacements between a selected group of samples of said first log and selected groups of samples of said second log; testing the last recited indications of fit against selected criteria and selecting, on the basis of said testing, at least one as representing a possible displacement between said first and second logs; and scaling the last recited at least one indication of fit with a predetermined scale factor to produce a scaled version thereof which is substantially different from the remaining indications of fit, and including the last recited at least one indication of fit in said tangible representation.

29. The method of claim 28 wherein said additional selected sample level is adjacent to said selected sample level.

30. The method of claim 29 wherein said selected sample levels are in close proximity to one another.

31. The method of claim 30 wherein said selected groups of samples of said first log overlap one another in terms of borehole depth.

32. The method of claim 31 wherein said selected sample levels correspond to borehole depth levels.

33. The method of claim 32 wherein said first and second logs correspond to well logging signals sampled at substantially constant borehole depth increments.

34. The method of claim 33 and further in which the step of producing said tangible representation comprises outputting representations of said scaled and unscaled indications of fit to a recording device.

35. The method of claim 34 in which the step of producing said tangible representation comprises recording said output on a recording medium.

36. The method of claim 35 in which the recording step comprises incrementing said recording medium between output steps.

37. The method of claim 36 wherein said increment is a function of the depth interval between said selected sample levels so as to produce a recording of said scaled and unscaled indications of fit as a function of depth and wherein said recording indicates possible depth displacements between said well logs.

* * * * *